United States Patent [19]

Barton, Jr. et al.

[11] Patent Number: 4,677,508
[45] Date of Patent: Jun. 30, 1987

[54] ENDWISE LOADED CARTRIDGE TAPE DRIVE

[75] Inventors: William M. Barton, Jr., Encinitas; John F. Murphy; Karl B. Offerman, both of San Diego; Richard G. Fisher, Torrance, all of Calif.

[73] Assignee: Cipher Data Products, Inc., San Diego, Calif.

[21] Appl. No.: 831,857

[22] Filed: Feb. 24, 1986

Related U.S. Application Data

[63] Continuation of Ser. No. 441,762, Nov. 15, 1982, Pat. No. 4,573,091.

[51] Int. Cl.$^4$ ............................................. G11B 5/008
[52] U.S. Cl. ................................. 360/96.5; 360/106
[58] Field of Search ............... 360/96.5, 93, 85, 105, 360/106, 95; 242/198-200

[56] References Cited

U.S. PATENT DOCUMENTS

| | | | |
|---|---|---|---|
| 2,485,575 | 10/1949 | Deaver | 274/9 |
| 3,471,096 | 10/1969 | Hancock | 242/55.19 |
| 3,495,835 | 2/1970 | Laa | 274/4 |
| 3,524,651 | 8/1970 | Ketzer | 274/4 |
| 3,603,743 | 9/1971 | Ban | 179/100.2 |
| 3,689,077 | 9/1972 | Ohira | 274/4 |
| 3,692,255 | 9/1972 | Von Behren | 242/192 |
| 3,697,085 | 10/1972 | Ban | 274/4 |
| 3,800,325 | 3/1974 | O'Brien | 360/98 |
| 3,864,743 | 2/1975 | Staar | 360/94 |
| 3,877,072 | 4/1975 | Azimi | 360/94 |
| 3,899,794 | 8/1975 | Brown, Jr. | 360/133 |
| 3,900,170 | 8/1975 | Serizawa | 242/198 |
| 3,922,719 | 11/1975 | Negishi et al. | 360/88 |
| 3,924,823 | 12/1975 | Cohen et al. | 242/198 |
| 3,947,883 | 3/1976 | Suzuki | 360/93 |
| 3,949,951 | 4/1976 | Porter, Jr. et al. | 242/192 |
| 3,959,821 | 3/1976 | Nardino | 360/96 |
| 3,959,823 | 5/1976 | Heidecker et al. | 360/99 |
| 3,964,098 | 6/1976 | Kramer et al. | 360/93 |
| 3,976,262 | 8/1976 | Kennedy | 242/192 |
| 3,977,625 | 8/1976 | Maxwell, Jr. et al. | 242/198 |
| 3,987,486 | 10/1976 | Ito et al. | 360/96 |
| 4,006,493 | 2/1977 | Gerry | 360/132 |
| 4,014,041 | 3/1977 | Cicatelli | 360/96 |
| 4,021,006 | 5/1977 | Morimoto et al. | 242/199 |
| 4,031,554 | 6/1977 | Umeda et al. | 360/73 |
| 4,045,821 | 8/1977 | Fujikura | 360/132 |
| 4,085,906 | 4/1978 | Dahl et al. | 242/192 |
| 4,099,686 | 7/1978 | Moya | 242/198 |
| 4,101,949 | 7/1978 | Cicatelli | 360/137 |

(List continued on next page.)

FOREIGN PATENT DOCUMENTS

| | | |
|---|---|---|
| 2823226 | 11/1978 | Fed. Rep. of Germany . |
| 3244165 | 5/1984 | Fed. Rep. of Germany . |
| 2214933 | 1/1973 | France . |
| 822012 | 11/1974 | France . |
| 2353114 | 12/1977 | France . |
| 2482758 | 11/1981 | France . |
| 89785 | 1/1976 | Japan . |
| WO82/03939 | 11/1982 | PCT Int'l Appl. . |
| 1567864 | 5/1980 | United Kingdom . |

OTHER PUBLICATIONS

Mini-Micro Systems—"Cartridge-drive Vendors Plan Higher Capacity Hardware", pp. 16-20/Jul. 1981.
Computer Systems News, Oct. 15, 1982, article re Archive Corp. Drive.
Electronics, Nov. 30, 1982, "Streaming Cartridge Tape Drive Fits . . . ".
Electronic Buyer's News, Dec. 6, 1982, "Archive Adds ¼-In. Drives".
Wangtek, Product Specification and User's Manual Series 5000 (five pages).

*Primary Examiner*—A. J. Heinz
*Attorney, Agent, or Firm*—Baker, Maxham & Jester

[57] ABSTRACT

A drive which permits endwise loading of the ANSI standard one-quarter inch tape cartridge in an enclosure having a width of approximately five and three-quarter inches. The drive has a mechanism for partially opening the tape access door of the cartridge upon insertion thereof so that the door pivots clear of a read/write head. Another mechanism is provided for thereafter operatively engaging and disengaging the read/write head with a length of tape in the cartridge.

52 Claims, 20 Drawing Figures

| | | | |
|---|---|---|---|
| 4,133,014 | 1/1979 | Righi | 360/96 |
| 4,156,260 | 5/1979 | Joshi | 360/96.1 |
| 4,161,007 | 7/1979 | Haraguchi | 360/137 |
| 4,188,647 | 2/1980 | Tanaka | 360/105 |
| 4,199,795 | 4/1980 | Hunter | 360/93 |
| 4,216,508 | 8/1980 | Hunter | 360/93 |
| 4,257,075 | 3/1981 | Wysocki et al. | 360/96.5 |
| 4,262,860 | 4/1981 | Hurtig et al. | 242/192 |
| 4,275,426 | 6/1981 | Hoffman | 360/99 |
| 4,303,955 | 12/1981 | Kramer et al. | 360/93 |
| 4,313,143 | 1/1982 | Zarr | 360/106 |
| 4,337,908 | 7/1982 | Sims, Jr. | 242/198 |
| 4,344,097 | 8/1982 | Takai | 360/96.6 |
| 4,361,859 | 11/1982 | Schalteman | 360/96.5 |
| 4,470,083 | 9/1984 | Doering et al. | 360/97 |
| 4,489,355 | 12/1984 | Kudi | 360/96.5 |
| 4,498,112 | 2/1985 | Georgens et al. | 360/96.5 |
| 4,514,775 | 4/1985 | Manning | 360/106 X |
| 4,555,077 | 11/1985 | Platter et al. | 242/198 |

OTHER PUBLICATIONS

Scorpion Drive (one page, hand drawn sketch).

"Cartridge-Drive System Suits Winchester Backup'-'—Electronic Design, May 10, 1980.

"Half-Inch Tape Provides 8" Winchester Back-up'-'—Digital Design, May, 1980.

"Tape Back-up for Winchester Fixed Disks; $\frac{1}{4}''$ vs. $\frac{1}{2}''''$"—Digital Design, May, 1980.

"Variable Speed Cassette Tape Transport"—IBM Technical Disc. Bulletin, vol. 22, No. 4, Sep., 1979.

"A New Twist in Winchester Backup"—Mini-Micro Systems/Feb., 1980.

"A New Role for Magnetic Tape" (Mini-Micro Systems), Nov. 1981).

DEI Brochure, 1983 re Microtape EL-1, SL-1, 5/83.

Special Advertising Section, Electronics, Mar. 10, 1981.

"Video Recorders Set to Back Winchesters", Electronics, Nov. 17, 1981.

"Tape Drive Backs Up Winchesters with 10 M bytes", Electronic Design, Apr. 29, 1982, p. 42.

"$\frac{1}{4}$-in. Cartridge Drive Matches the Dimensions of 5$\frac{1}{4}$-in. Winchesters"—Electronic Design, p. 42, Jul. 22, 1982.

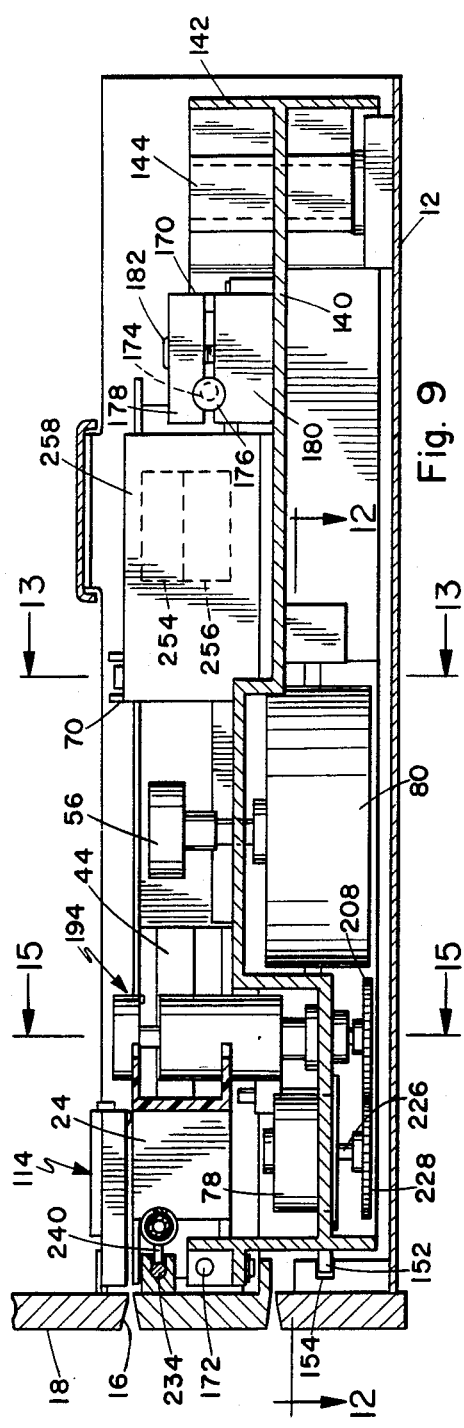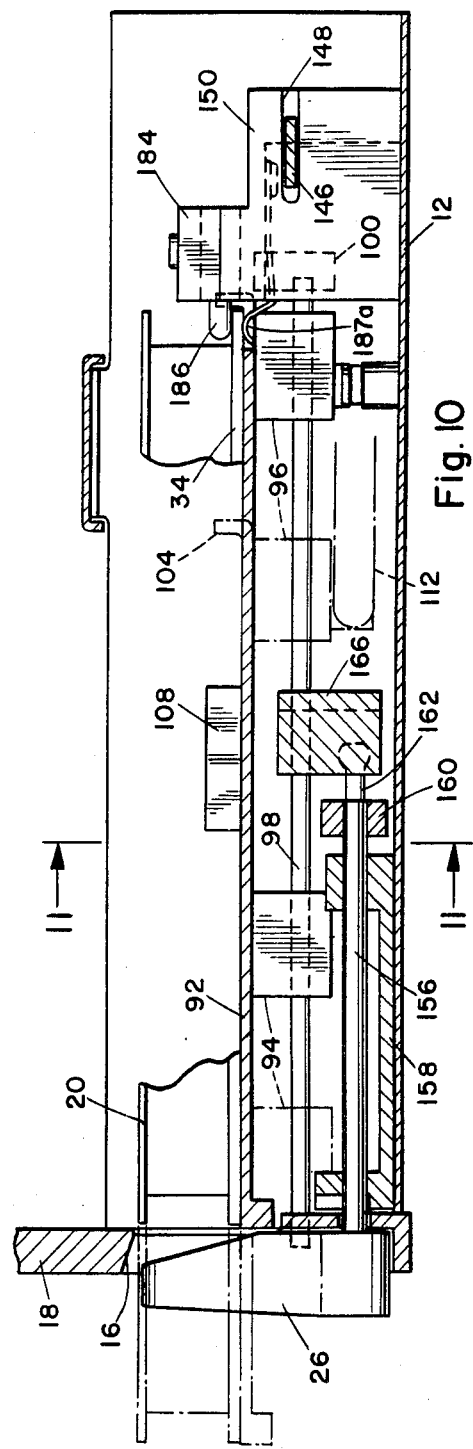

ENDWISE LOADED CARTRIDGE TAPE DRIVE

This is a continuation of application Ser. No. 441,762 filed Nov. 15, 1982 which is now U.S. Pat. No. 4,573,091 granted Feb. 25, 1986.

BACKGROUND OF THE INVENTION

The present invention relates to magnetic tape drives, and more particularly, to a magnetic tape drive for storage and retrieval of digital data in which an elongate, rectangular tape cartridge is endwise loaded into a rectangular housing.

The five and one-quarter inch Winchester disk drive which provides substantial storage capacity and rapid data access is becoming increasingly popular as a principal memory for personal and small business computers, which until recently, used exclusively flexible or floppy disk memories. A five and one-quarter inch Winchester disk drive may have a memory storage capacity of, for example, fifty-five megabytes. On the other hand, a typical floppy disk drive may have a storage capacity of only one-quarter megabyte.

Many computer systems have backup memory devices to assure against malfunctions or physical damage that could destroy the principal data bank. In the past, in personal and small business computer systems, the backup storage unit has typically consisted of a second floppy disk drive. However, the increasing use of five and one-quarter inch Winchester disk drives in personal and small business computers has created a need for greater backup storage. Floppy disk drives are unsuitable for use as backup storage for a five and one-quarter inch Winchester disk drive because the hard disk stores many times more information than a single floppy disk. For example, forty one-quarter megabyte floppy disks would be needed to backup one ten megabyte Winchester disk drive, making backup storage a time-consuming inconvenience for the operator.

A magnetic tape drive would be a more practical form of backup storage for the five and one-quarter inch Winchester disk drive. Such tape drive would preferably utilize a tape cartridge for convenience and durability. ANSI X3.55-1977 defines a standard one-quarter inch tape cartridge to facilitate industry compatability. One cartridge meeting this standard is the DC300XL cartridge manufactured by Minnesota Mining and Manufacturing. See U.S. Pat. No. 3,692,255. That cartridge measures approximately six inches in length and four inches in width. In addition, the cartridge has a door along one of its longer sides which must be swung open so that the tape drive head can make contact with the tape. This door, when fully open, increases the width of the cartridge from approximately four inches to approximately five and three-quarter inches.

Currently floppy disk drives and five and one-quarter inch Winchester disk drives are constructed to meet an industry standard which requires that they fit within a rectangular box measuring approximately three and one-quarter inches in height by five and three-quarter inches in width by eight inches in length. The foregoing dimensions are hereinafter referred to as the five and one-quarter inch form factor for a mechanical transport. It would be desirable to provide a magnetic tape drive which would fit the foregoing industry mechanical form factor while utilizing the aforementioned 3M cartridge. The magnetic tape transport could then be inserted into the same physical enclosure or hardware designed to receive the five and one-quarter inch Winchester or floppy disk drives.

It is difficult to provide a magnetic tape drive which can receive and utilize the aforementioned 3M tape cartridge in the relatively small industry mechanical form factor. Because the cartridge is six inches in length, it cannot be loaded sideways into such a magnetic tape transport since the width of the mechanical form factor is only five and three-quarter inches. If the tape transport were installed in a receptacle within a mini-computer, there would be no access to the side of the tape drive unless the tape drive could be slid out of the mini-computer. Such sliding out of the entire drive would be undesirable since it would expose sensitive electronic and mechanical components of the drive to possible damage and contamination. Furthermore, such sliding out of the entire drive would require flexible busses and connectors which could fail with repeated use. Accordingly, it would be preferable to load the cartridge endwise into the tape drive. This presents a problem since the width of the cartridge is approximately five and three-quarter inches with the door fully open. Some mechanism would have to provided for opening the door of the cartridge and engaging the head with the tape in an extremely confined amount of space.

SUMMARY OF THE INVENTION

Accordingly, it is the primary object of the present invention to provide an improved cartridge tape drive.

Another object of the present invention is to provide an improved cartridge tape drive adapted to have a cartridge, with a tape access door, endwise loaded therein.

Another object of the present invention is to provide a tape drive having a mechanism for opening the tape access door of the cartridge during insertion of the cartridge into the drive.

Another object of the present invention is to provide a tape drive which can be loaded and unloaded in a manner similar to that of a floppy disk drive.

Another object of the present invention is to provide a tape drive in which the head and capstan drive are moved into engagement with the cartridge after the cartridge has been fully inserted into the drive.

Still another object of the present invention is to provide a tape drive which will fit within the industry three and one-quarter inch by five and three-quarter inch by eight inch form factor while accommodating endwise loading of a standard cartridge defined by ANSI standard X3.55-1977.

The present invention provides a drive which permits endwise loading of the ANSI standard one-quarter inch tape cartridge in an enclosure having a width of approximately five and three-quarter inches. The drive has a mechanism for partially opening the tape access door of the cartridge upon insertion thereof so that the door pivots clear of a read/write head. Another mechanism is provided for thereafter operatively engaging and disengaging the read/write head with a length of tape in the cartridge.

BRIEF DESCRIPTION OF THE DRAWINGS

FIG. 9 is a vertical sectional view of the preferred embodiment taken along Line 9—9 of FIG. 7.

FIG. 10 is a vertical sectional view of the preferred embodiment taken along Line 10—10 of FIG. 7.

DESCRIPTION OF THE PREFERRED EMBODIMENT

Figure 1:
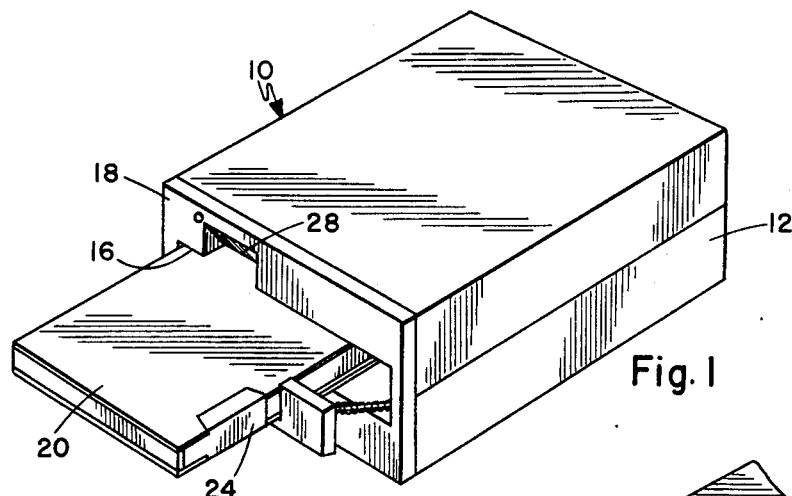
FIG. 1 is a perspective view of a preferred embodiment of the cartridge tape drive with its tray extended and a cartridge partially inserted.

Referring to FIG. 1, the preferred embodiment 10 of the cartridge tape drive has a rectangular housing 12 whose width, height and length are such that the housing will fit within the industry form factor for five and one-quarter inch Winchester disk drives and floppy disk drives.

A completely enclosed housing is not necessary where the drive is installed in a receptacle in a computer. Accordingly, the term "housing", as used herein, refers to any general support structure or frame for mounting the components of the drive in operative relationship. The term "within the housing" refers to something being located generally within the side edge boundaries of the frame or support structure. A horizontal tray 14 (FIGS. 2 and 3) slides partially out of the tape drive through a slot 16 formed in a front panel 18 of the housing. An LED 19 is mounted in the front panel to indicate the drive select status. The tray is dimensioned for receiving a magnetic tape cartridge 20 which is loaded endwise therein. The tape cartridge 20 is preferably of the type which meets ANSI specification X3.55-1977. One such cartridge is the model DC300XL sold by Minnesota Mining and Manufacturing.

Figure 3:
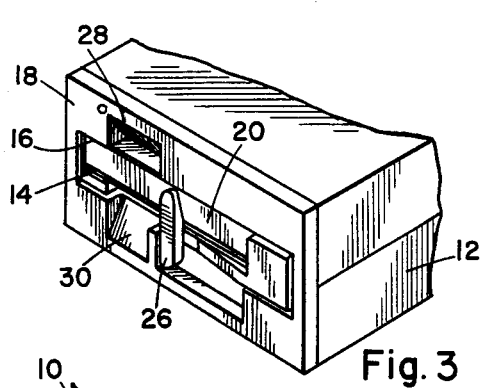
FIG. 3 is a perspective view of the preferred embodiment with the tray closed and locked.
Figure 2:
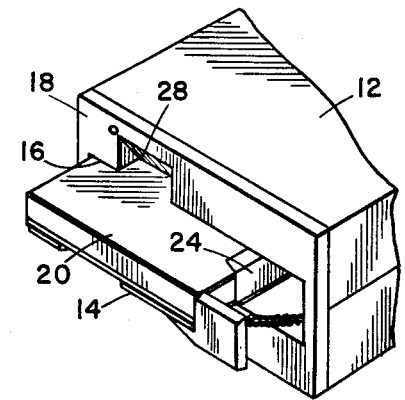
FIG. 2 is a perspective view of the preferred embodiment with the cartridge fully inserted into the tray.

The cartridge 20 is slid fully into the tray 14 as illustrated in FIG. 2 so that the end edges of the cartridge coincide with the end edges of the tray. Thereafter, continued pushing on the cartridge 20 causes the tray to slide rearwardly until both the tray and the cartridge are entirely within the housing as illustrated in FIG. 3.

Figure 4:
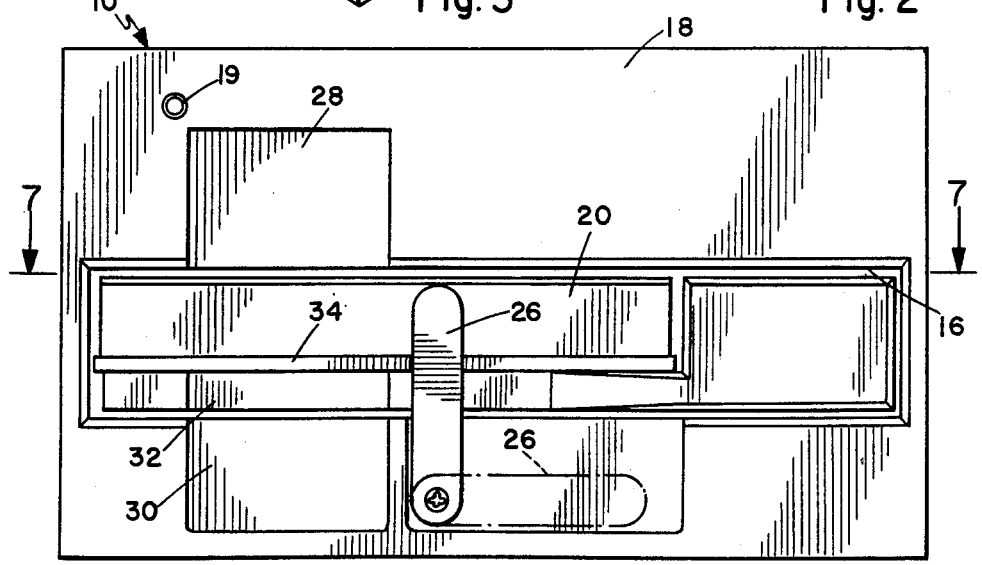
FIG. 4 is an enlarged front end elevation view of the preferred embodiment of the cartridge tape drive.

During this loading of the cartridge, mechanisms hereafter described in greater detail, open the door 24 which is hingedly attached to one side edge of the tape cartridge 20. During the insertion of the cartridge, an upper cartridge insertion guide is lifted clear of the tape cartridge door. Once the cartridge is fully loaded into the drive, a load lever 26 (FIG. 3) is rotated approximately ninety degrees into a vertical position. Through a linkage this causes a magnetic read/write head, a capstan drive, and cartridge location pins to move into engagement with the tape cartridge as described hereafter in greater detail. The unlocked and locked positions of the load lever 26 are illustrated in phantom lines and solid lines, respectively, in FIG. 4. Detents and recesses, not illustrated, may be provided on the lever 26 and front panel 18 so that the load lever 26 snaps into its unlocked and locked positions.

The front panel 18 of the tape drive is formed with upper and lower, inwardly tapering finger recesses 28 and 30 (FIG. 4) on either side of the slot 16. A similar recess 32 (FIG. 8) is formed in the forward end of the tray 14, in alignment with the finger recesses 28 and 30. These finger recesses permit an operator to grasp the end of the tape cartridge 20 between his or her thumb and index finger and to remove the cartridge from the tray. The load lever 26, after it is rotated to its locked position shown in solid lines in FIG. 4, blocks the entry slot 16. This lever thus provides assurance of full tray entry and also provides a visual cartridge loaded indicator.

Figure 5:
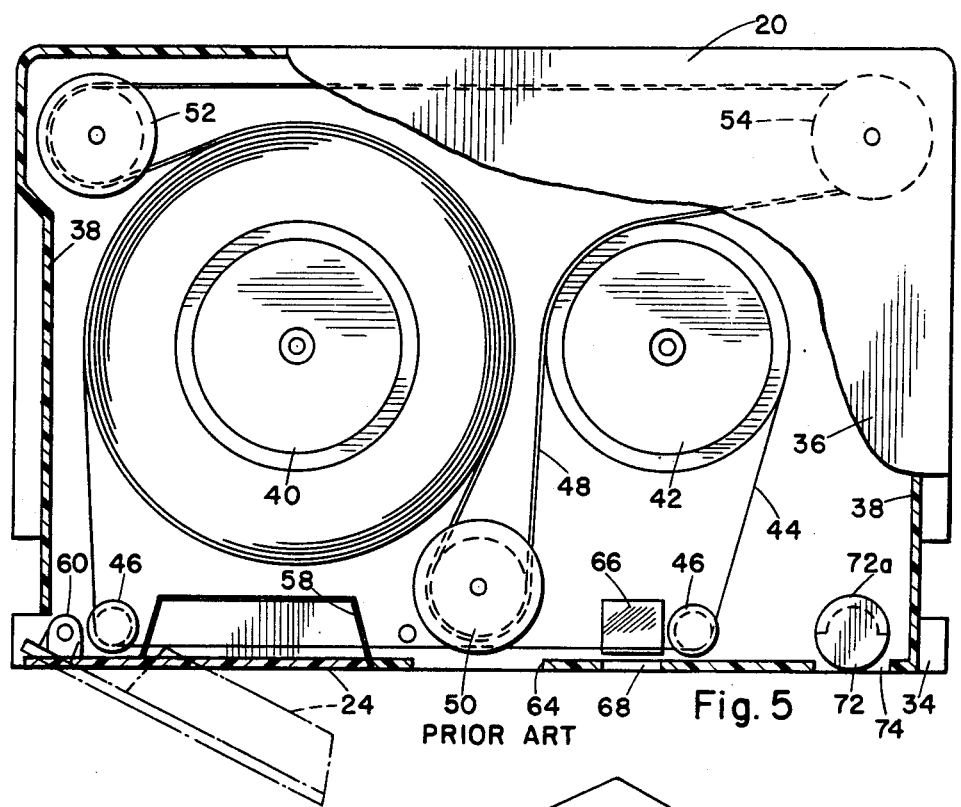
FIG. 5 is a top plan view of the tape cartridge with portions cut away and showing the open position of its access door in phantom lines.

Details of the conventional tape cartridge 20 are illustrated in FIG. 5. That cartridge measures approximately six inches in length and four inches in width. The door 24 of the cartridge increases the width of the cartridge to approximately five and three-quarter inches when the door is fully opened. The cartridge has a solid metal base plate 34, and a top cover 36. The end walls 38 of the cartridge are slightly indented from the end edges of the plates 34 and 36. A pair of reels 40 and 42 are rotatably mounted within the cartridge between the plates 36 and 38. A length of magnetic tape 44 is wound back and forth between the reels around a pair of idler rollers 46. A drive belt 48 is driven around three separate rollers, 50, 52 and 54. When the belt capstan roller 50 is rotated by a capstan drive roller 56 (FIG. 6) the drive belt 48 rotates the reels 40 and 42 so that the magnetic tape is unwound from one of the reels and rewound onto the other reel.

The cartridge 20 has a cut-out region 58 along one side edge thereof which is conformably shaped for receiving the door 24. The door 24 is pivotally connected to the corner of the cartridge 20 by a hinge assembly 60. As previously indicated, when the tape cartridge 20 is inserted into the drive, mechanisms open the door 24 of the cartridge. Thereafter, rotation of the load lever 26 brings a read/write head 62 (FIG. 6) into the cut-out region 58 so that the head can make contact with the tape 44 as illustrated in FIG. 6.

Rotation of the load lever also brings the capstan drive roller 56 (FIG. 6) into a cut-out region 64 and into contact with the belt capstan roller 50. As best seen in FIG. 5, the belt capstan roller 50 has an upper larger portion and a lower smaller portion illustrated in phantom lines. The larger portion of the drive belt capstan roller 50 extends above and beyond the magnetic tape 44 so that the capstan drive roller 56 can engage the belt capstan roller without touching either the tape 44 or the drive belt 48.

The cartridge 20 also has a mirror 66 (FIG. 5) positioned behind a window 68 which is utilized in connection with an end of tape/beginning of tape (EOT/BOT) sensing mechanism 70 in the tape drive. The cartridge 20 also has a file protect mechanism consisting of a rotatable half cylinder 72 (FIG. 5) positioned in front of a cut-out region 74. A file protect sensor 76 (FIG. 6) determines whether or not the cut-out region 74 is blocked by the semi-circular portion 72a of the file protect cylinder.

Figure 6:
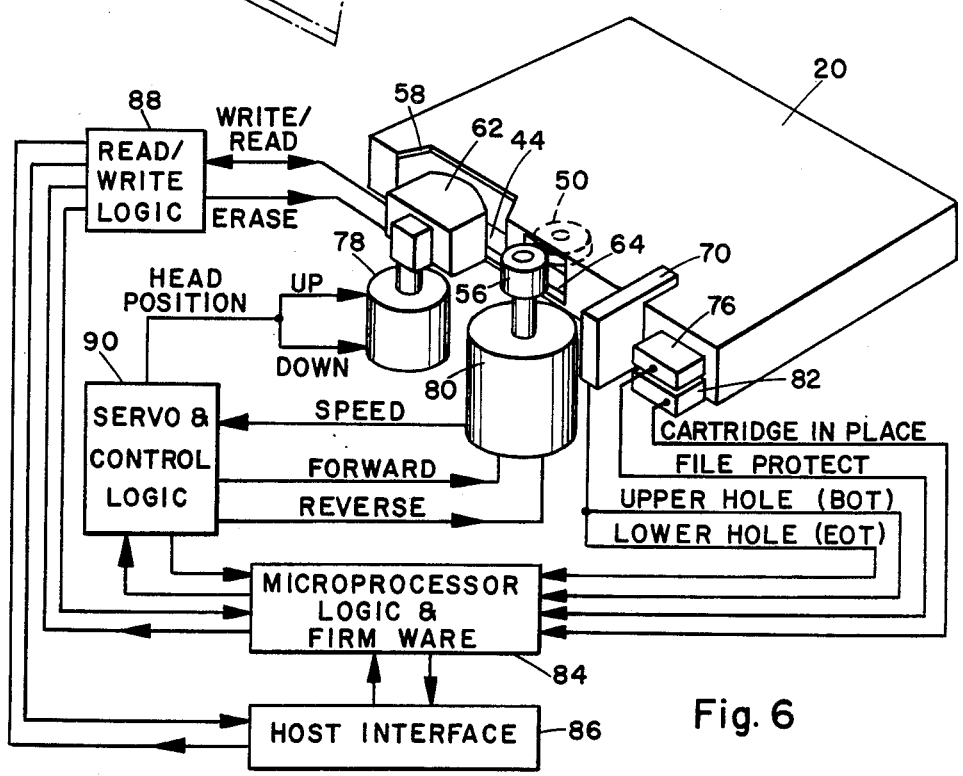
FIG. 6 is a schematic illustration of the control system of the tape drive and the manner in which its capstan drive and head engage the tape cartridge.

Referring to FIG. 6, the read/write head 62 is vertically reciprocable by energizing a stepper motor 78 to select any one of twelve different tracks on the tape. The capstan drive roller 56 is mounted on the upper end of the shaft of a brushless DC motor 80. A sensor 82 is mounted in the tape drive adjacent the file protect sensor 76 and is utilized to detect when a cartridge is in place within the drive.

FIG. 6 also illustrates the control circuitry of the tape drive, details of which are not the subject of the present application. This circuitry is mounted on one or more PC boards (not shown) which are positioned horizontally above the cartridge within the housing. The control system includes a microprocessor, logic and firmware denoted 84 in FIG. 6. A host interface 86 is provided for enabling communication between a computer or other source of data. Read/write logic 88 is connected between the head 62 on the one hand and the microprocessor 84 and host interface 86 on the other hand. The head 62 also functions to erase blocks of data from the tape 44 under control of the read/write logic 88. The microprocessor controls the stepper motor 78 and the brushless DC motor 80 through a servo and control logic 90.

Figure 7:
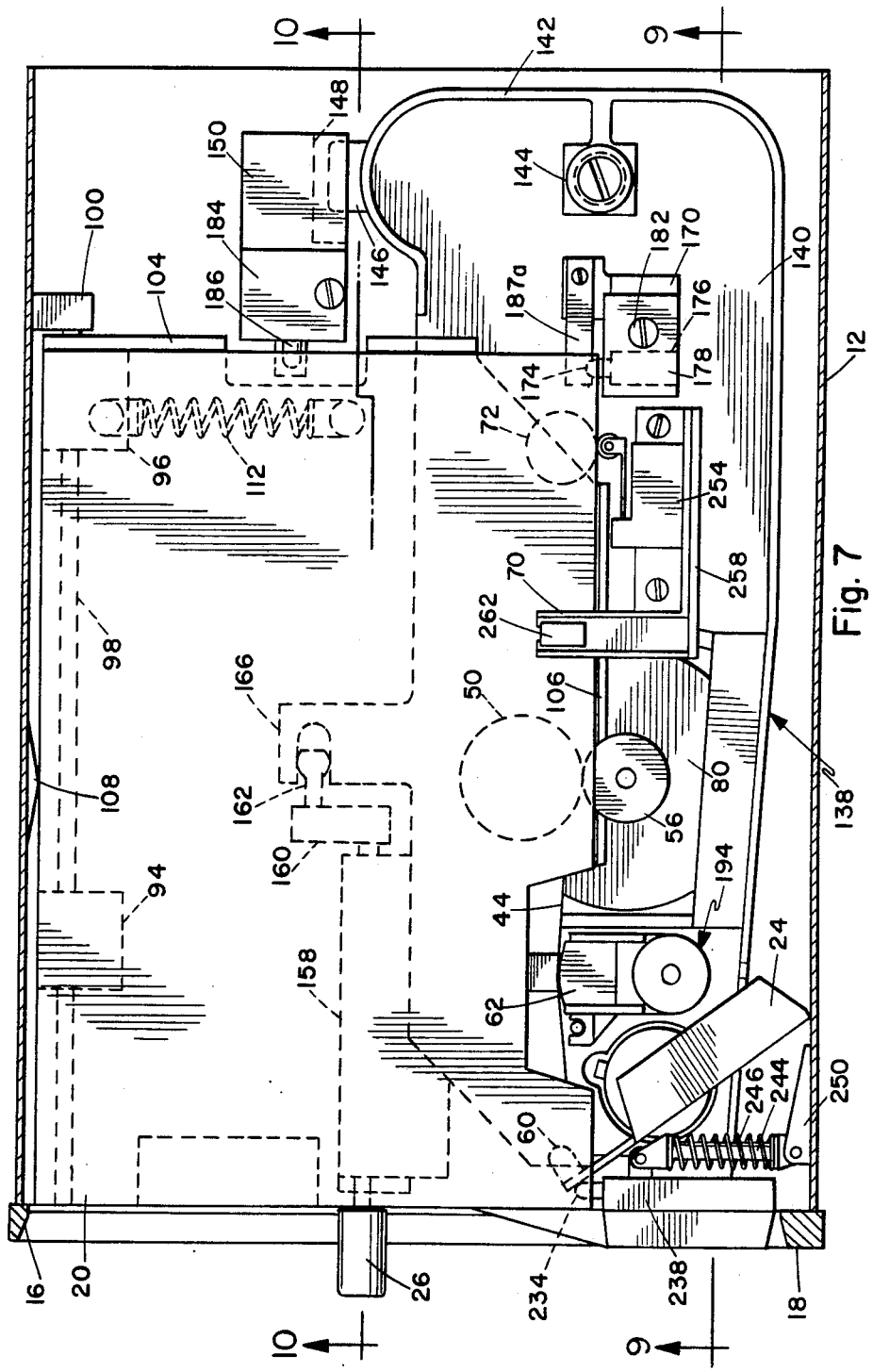
FIG. 7 is a horizontal sectional view of the preferred embodiment of the cartridge tape drive taken along Line 7—7 of FIG. 4.
Figure 8:
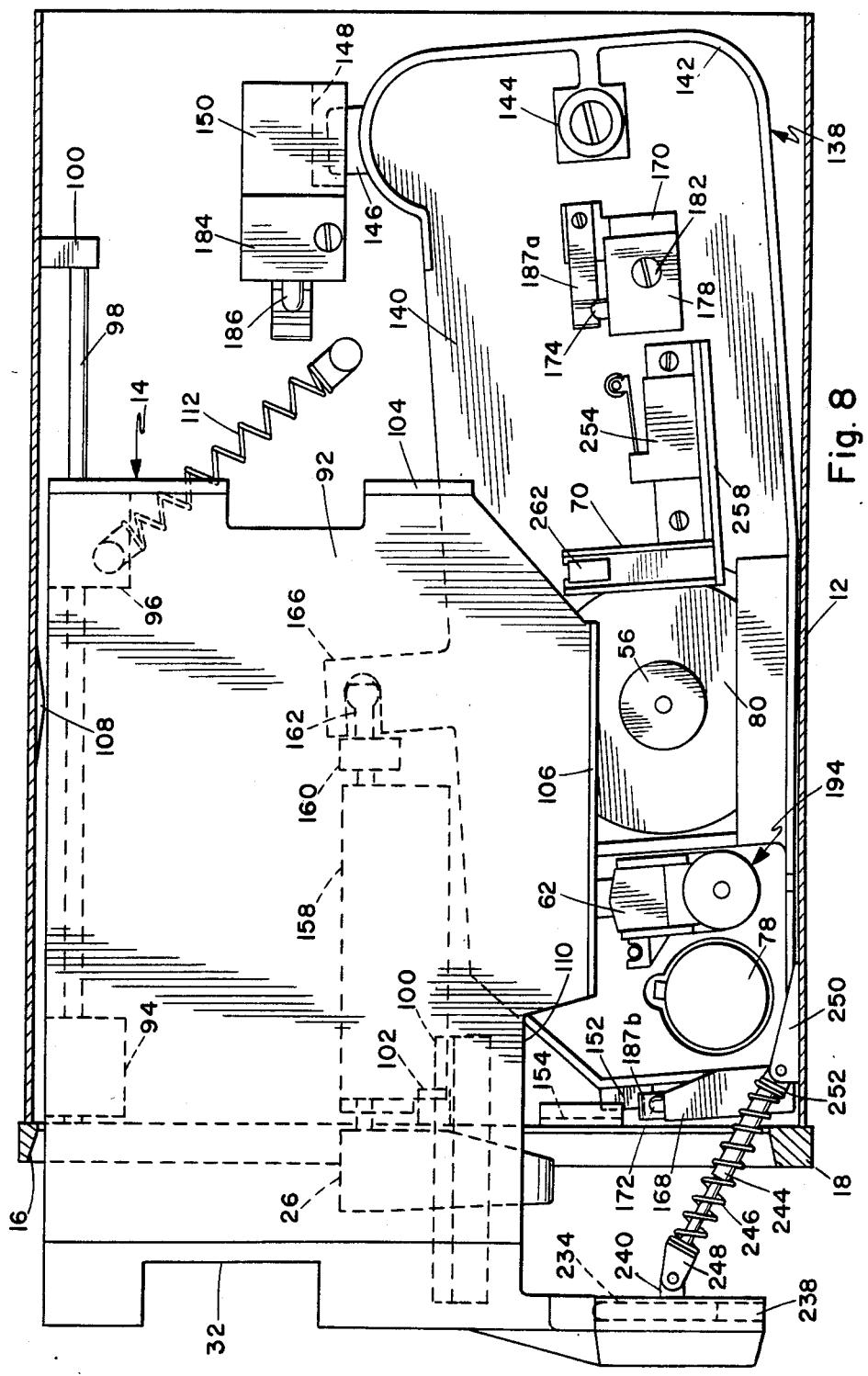
FIG. 8 is a horizontal sectional view of the preferred embodiment similar to FIG. 7, but with the tray extended and the capstan drive mechanism of the tape drive disengaged.
Figures 16, 17, 18:
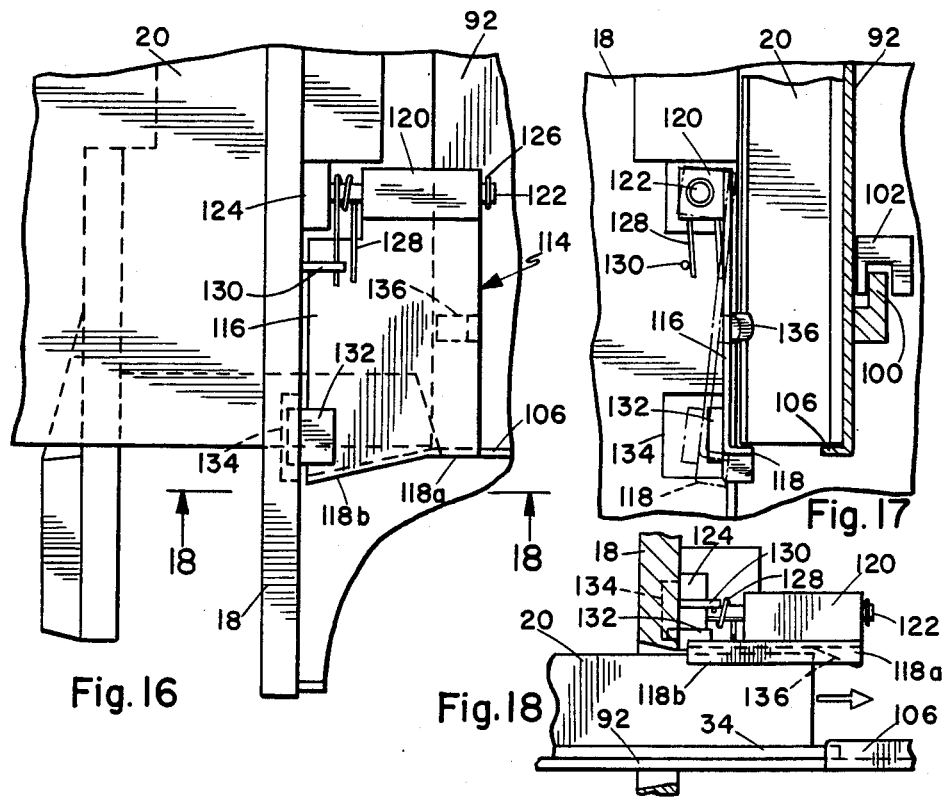
FIG. 16 is an enlarged, fragmentary top plan view of the forward portion of the preferred embodiment of the cartridge tape drive showing the cartridge insertion guide.
FIG. 17 is a rear elevation view of the structure of FIG. 16 showing the insertion guide action.
FIG. 18 is a horizontal sectional view of the cartridge insertion guide taken along Line 18—18 of FIG. 16.

The tray 14 has a horizontal base 92 (FIGS. 7 and 11) having a width and length substantially equal to that of the tape cartridge 20 which it supports. A pair of support blocks 94 and 96 (FIGS. 7, 10 and 11) are attached to the underside of the base 92 at spaced locations adjacent the left hand side edge thereof. These support blocks have horizontal holes therethrough so that they can slide back and forth on a rod 98 (FIGS. 7 and 10). The rear end of this rod is secured to a bracket 100 (FIG. 8) attached to the left side wall of the housing 12. The forward end of the rod 98 is secured to the front panel 18 of the housing. The right side edge of the base 92 of the tray is slidingly supported. Referring to FIGS. 8 and 17, an elongate guide tooth 100 is secured to the underside of the base 92 of the tray 14 and extends forwardly and rearwardly. The projecting portion of the guide tooth 100 slides within a conformably shaped track piece 102 attached to the front panel 18.

The base 92 of the tray is thus supported for sliding movement between a retracted position illustrated in FIG. 7 and a fully extended position illustrated in FIG. 8. The amount that the tray can be extended is limited by the forward one of the spacer blocks 94 which contacts the inside surface of the front panel 18 to limit further extension of the tray as best seen in FIG. 8. The retracted and extended positions of the tray are further illustrated by the retracted and extended positions of the spacer blocks 94 and 96 illustrated in solid and phantom lines, respectively, in FIG. 10.

As best seen in FIGS. 8 and 10, the rear end edge of the base 92 of the tray 14 has an upwardly extending flange 104 and the right side edge of the base has an upwardly extending flange 106. These flanges engage the rear and right side edges of the tape cartridge to help maintain the tape cartridge in proper alignment within the tape drive. The left side edge of the tape cartridge is engaged by a boss 108 (FIG. 8) which extends from the inside surface of the left side wall of the housing 12. The right side edge of the base 92 has a cut-out region 110 (FIG. 8) which coincides with the cut-out region 58 of the tape cartridge when the tape cartridge has been fully inserted into the tray. This cut-out region 110 in the base provides clearance to allow the head 62 to engage the tape as illustrated in FIG. 7.

A coil spring 112 (FIG. 8) is secured at one end to the bottom wall of the housing 12 and at its other end to the support block 96. The spring 112 is shown in its compressed condition in phantom lines in FIG. 7. When the tray 14 is pulled out, the spring 112 expands from its compressed condition, and the force of the spring aids the operator in pulling the tray out. The expanded condition of the spring is illustrated in solid lines in FIG. 8. As will become more apparent hereafter, the spring insures that the tray extends all the way so that the cartridge door opening mechanism is clear to enable the cartridge to be pulled out of the tray.

When the tape cartridge 20 is initially inserted into the tray 14, a cartridge insertion guide 114 (FIG. 16) engages the top right side edge of the cartridge and guides the cartridge into engagement with the flange 106 (FIG. 8) of the base 92 of the tray. Shortly after the cartridge insertion guide engages the rearward end of the cartridge, the guide swings upwardly away from the cartridge. Thus, when the cartridge has been completely inserted into the tray, the cartridge insertion guide does not interfere with opening of the cartridge tape access door.

Details of the construction of the cartridge insertion guide are illustrated in FIGS. 16, 17 and 18. The cartridge insertion guide 114 includes a horizontal panel 116 having a downwardly extending flange 118 which extends from its outer end. The flange has a straight rearward portion 118a (FIG. 16) and an outwardly diverging forward portion 118b. A mounting block 120 is secured to the inside edge of the panel 116. This mounting block rotates on a post 122 whose inner end is rigidly fixed in a boss 124 on to the inside surface of the front panel 116. A retainer 126 holds the block 120 on the post. A torsion spring 128 is wrapped around the post 122. One leg of the torsion spring rests against the upper side of the panel 116 and the other leg of the torsion spring is held by a pin 130 which extends from the inside surface of the front panel 18. The torsion spring thus biases the insertion guide 114 downwardly to its position shown in solid lines in FIGS. 17 and 18.

A tab 132 (FIG. 16) is secured to the top surface of the outer portion of the panel 116 and extends forwardly beyond the forward edge of the panel. The forward end of the tab extends into a vertical slot 134 formed in the inside surface of the front panel 18 and illustrated in phantom lines in FIG. 16. As illustrated in FIG. 18, the lower end of the slot 134 is positioned so that the downward limit of the movement of the tab 132 places the panel 116 in a horizontal position.

The underside of the panel 116 has an inclined cam 136 (FIGS. 16 and 18). When the rearward end of the tape cartridge 20 (FIG. 18) is inserted into the tray through the loading slot in the front panel of the drive, the flange 118 of the cartridge insertion guide engages the side edge of the cartridge to guide the cartridge to the side flange 106 of the base 92 of the tray. Slightly before the end of the tape cartridge reaches the flange 106, the cam 136 engages the end of the tape cartridge and lifts the panel 116 and the flange 118 away from the cartridge. Thus, when the cartridge is fully inserted onto the tray, as illustrated in FIG. 2, the cartridge insertion guide does not obstruct the opening of the access door 24 of the cartridge. The cam 136 may be replaced by a roller wheel.

Referring to FIGS. 7 and 8, within the housing 12 the read/write head 62 and the capstan drive motor 80 are supported on an elongated frame 138. The frame enables these components to be engaged and disengaged with the tape cartridge 20 after it has been inserted onto the tray and the tray has been moved to its retracted position within the housing. The frame 138 extends longitudinally within the housing almost the entire length thereof. The frame 138 consists of a horizontal planar section 140 and a vertical flange 142 (FIGS. 7 and 15) which extends along portions of the peripheral edge of the planar section.

The flange 142 imparts strength and rigidity. The rearward end of the frame 138 is rotatably supported by a bearing assembly 144 (FIGS. 7 and 9). Ninety degree rotation of the load lever 26 from its horizontal position illustrated in phantom lines in FIGS. 4 and 8 to its vertical position illustrated in solid lines in FIGS. 3 and 7 causes the frame 138 to pivot or rotate in a clockwise direction. The frame is rotated through approximately four and one-half degrees of rotation from the position illustrated in FIG. 8 to the position illustrated in FIG. 7. The frame 140 rotates beneath the base 92 of the tray 14. When the tray is in its retracted position illustrated in FIG. 7, and a cartridge is loaded on the tray, the capstan drive roller 56 engages the belt capstan roller 50 of the tape cartridge and the head 62 engages the magnetic tape 44.

As the tape cartridge and tray are pushed into the housing of the drive, the tape access door 24 of the cartridge is opened. This opening of the tape access door takes place when the frame 138 is in its disengaged position illustrated in FIG. 8. As will be described hereafter in greater detail, a special mechanism opens the access door as the tray is being pushed in so that the tape access door will swing clear of, and not contact, the head support mechanism. This action is illustrated by the sequence of views consisting of FIGS. 19, 20 and then FIG. 7. Because of the dimensional constraints of opening the tape access door of the 3M cartridge within the industry mechanical form factor, an advantage is achieved by opening the tape access door before the tape cartridge is totally inside the housing.

Means are provided for preventing twisting or out of plane movement of the pivoting frame 138. Specifically, a tab 146 (FIG. 8) extends from the rearward end of the frame and moves horizontally within a slot 148 (FIGS. 8 and 10) formed in the side of a support block 150 mounted to the bottom wall of the housing. A flange 152 (FIGS. 8 and 9) extends horizontally from the forward end of the frame 138 and slides within a horizontal recess 154 (FIG. 9) formed in the inside wall of the front panel 18.

Linkage means are provided for coupling the load lever 26 with the frame 138 so that rotation of the load lever will pivot the frame between its disengagement and engagement positions. Referring to FIG. 10, the load lever 26 is secured to the forward end of a rod 156 which extends through holes in a pair of longitudinally spaced upstanding projections of a support member 158 mounted on the bottom wall of the housing. A crank 160 (FIGS. 10 and 11) is secured to the rearward end of the rod 156. The outer arm 162 of the crank has a rounded end which seats in a rounded vertical socket 164 (FIG. 11) formed in an arm 166 (FIG. 7) extending from the inside side edge of the frame 138. When the load lever 26 is rotated, the rounded end of the outer arm 162 of the crank moves vertically within the socket 164 and causes lateral displacement of the frame 138. The dimensions of the crank, the length of the frame 138 and the relative position of the frame bearing assembly 144 are such that ninety degree rotation of the load lever 26 between the positions illustrated in FIG. 4 rotates the frame through approximately four and one-half degrees of rotation. A rub block 167a abuts the rod 156 and is biased by a compressed spring 167b slidable in a socket 167c. This rub block accommodates crank over travel to ensure rigid seating of the cartridge.

The frame 138 carries a pair of reference locators 168 and 170 (FIG. 8). These locators have cartridge location pins 172 and 174, respectively, which engage and hold down the base plate 34 of the cartridge when the cartridge is fully loaded and the frame is swung to its engagement position as illustrated in FIG. 7. The detent pin 174 (FIG. 9) extends eccentrically from a cylindrical main portion 176 (FIG. 7). This main portion is squeezed between a pair of clamping blocks 178 and 180 held together by a screw 182. The screw 182 may be loosened and the main portion 176 of the pin 174 rotated. This changes the height of the pin and this height adjustment can be used to adjust the tilt of the cartridge on the frame.

Another reference locator 184 (FIG. 7) having similar construction to the reference locator 170 is mounted to the bottom wall of the housing forward of the support block 150. The cartridge location pin 186 of the reference locator 184 engages the rearward edge of the base plate of the cartridge 34. The height of the pin 186 may also be adjusted in a fashion similar to the adjustment of the height of the pin 174. Thus, the reference locators 170 and 184 provide a means for adjusting the tilt of the cartridge with respect to the base 92 of the tray. This adjustment can be used for factory fine tuning of the azimuth adjustment of the head with respect to the tape. Leaf springs 187a and 187b (FIG. 8) associated with the reference locators 170 and 184 deflect downwardly when contacted by the base plate 34 of the cartridge and urge the base plate up against the cartridge location pins 174 and 186.

Figure 11:
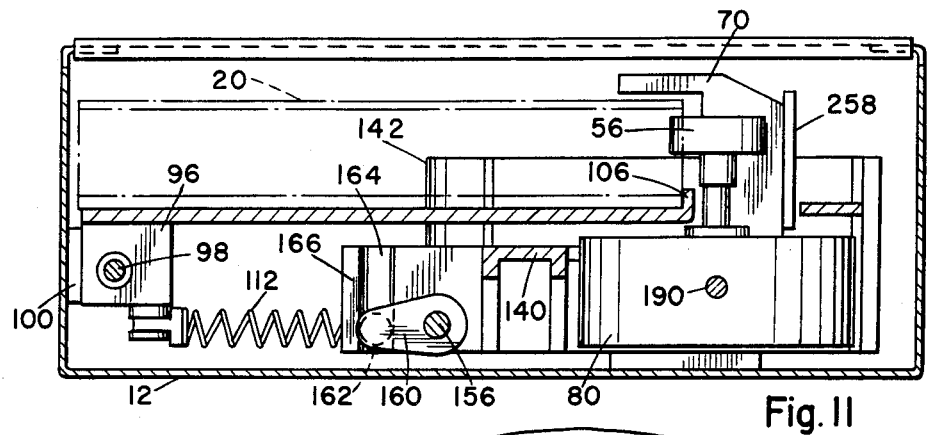
FIG. 11 is a vertical sectional view of the preferred embodiment taken along Line 11—11 of FIG. 10.
Figure 12:
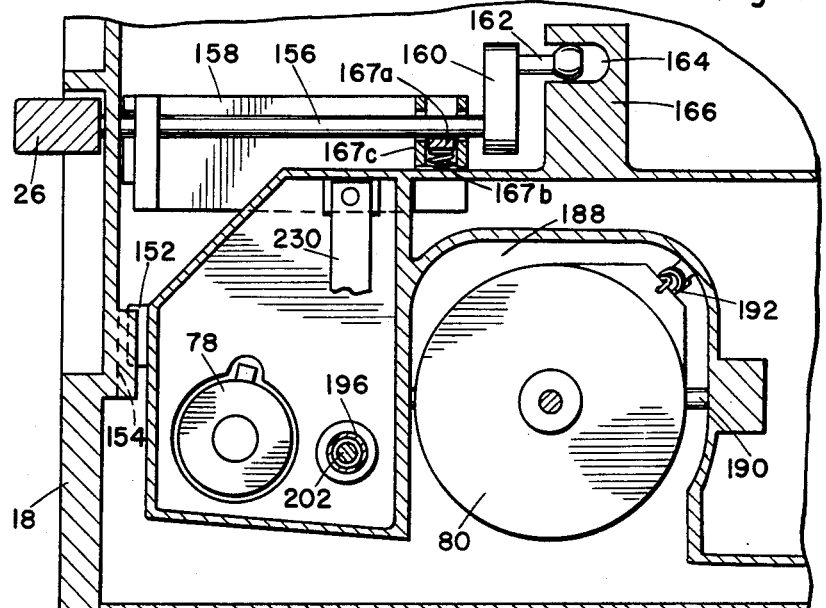
FIG. 12 is a fragmentary, horizontal sectional view of the preferred embodiment taken along Line 12—12 of FIG. 9.

As illustrated in FIGS. 11 and 12, the capstan drive motor 80 is gimbal mounted. Specifically, the frame has a large cut-out region 188 in which the motor 80 is located. Pins 190 extending from opposite sides of the motor, and diametrically with respect thereto, are rotatably supported within recesses formed in the portions of the frame 138 defining the cut-out region 188. A coil spring 192 is connected between the motor and the frame and urges the capstan drive roller 56 against the belt capstan roller 50 of the cartridge.

A special bearing structure is utilized to support the head for vertical reciprocation so that different tracks of data can be recorded onto and read from the tape. Due to the extremely small width of the tape (in the preferred embodiment one-quarter inch) the head must be vertically moved in a very precise manner. It is important that there be very little tilt of slope in the bearing during vertical movement of the head or else azimuth errors will be created. The read/write support bearing structure 194 is illustrated in detail in FIG. 15.

Figure 15:
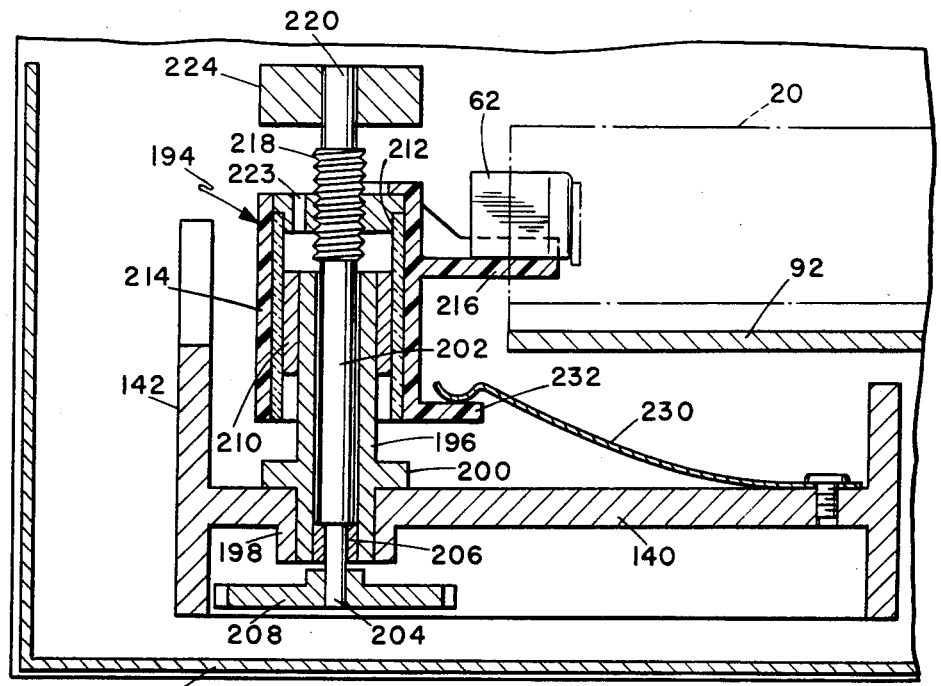
FIG. 15 is a fragmentary, enlarged, vertical sectional view taken along Line 15—15 of FIG. 9 illustrating the bearing structure which supports the read/write head for vertical reciprocation.

Referring to FIG. 15, a cylindrical sleeve 196 has its lower end seated within a receptacle 198 formed in the forward portion of the pivoting frame 138. The vertically extending sleeve 196 has a horizontal circumferential flange 200 which is firmly seated against the planar section 140 of the frame. A metal shaft 202 extends vertically within the sleeve 196 and is vertically spaced from the inside walls of the sleeves. A smaller diameter section 204 of the shaft is rotatably supported in a bearing 206 rigidly held within the lower end of the cylindrical sleeve 196. A gear 208 is rigidly connected to the lower end of the smaller diameter section 204 of the shaft. A graphite piston 210 is tightly fit around the upper end of the sleeve 196. A glass cylinder 212 surrounds the piston and is vertically reciprocable with respect to the piston.

Preferably the outside diameter of the graphite piston 210 (FIG. 15) is extremely close to the inside diameter of the glass cylinder 212. This is so that there will be almost no tilt of the glass cylinder with respect to the graphite piston during relative vertical movement. This in turn insures that there will be very little, if any, azimuth error with respect to the tape in the cartridge. Graphite pistons and glass cylinders manufactured to very close tolerances are available from Airpot Corporation. As an example, parts of this type are available which will insure that the tilt in 0.25 inches of graphite is a maximum of fifty microinches, producing less than one minute of arc.

A plastic cylinder 214 (FIG. 15) is tightly fit over the glass cylinder 212 and has a shelf 216 extending horizontally therefrom on which the read/write head 62 is securely mounted. The coefficients of thermal expansion of the graphite piston 210, glass cylinder 212 and plastic cylinder 214 are matched to minimize bearing inaccuracies. The upper end of the shaft 202 has a threaded segment 218 and a smooth upper end segment 220. A nut 222 is threadably engaged with the threaded segment 218 of the shaft and is snugly secured into the upper ends of the glass cylinder 212 and the plastic cylinder 214. An air bleed hole 223 extends through the nut 222. A stop 224 is rigidly secured to the smooth upper end segment 220 of the shaft.

Referring to FIG. 9, the stepper motor 78 is mounted on the upper side of the frame 138 forward of the bearing support structure for the magnetic head. The output shaft of the stepper motor extends vertically downwardly through a hole in the frame. A gear 228 rigidly secured to the end of the stepper motor output shaft 226 meshes with the gear 208 on the lower end of the shaft 202 (FIGS. 9 and 15). When the stepper motor is energized, the shaft 202 of the bearing support structure 194 is rotated, causing the glass cylinder 212, plastic cylinder 214, and read/write head 62 to travel vertically.

A leaf spring 230 (FIG. 15) has one end secured to the planar section 140 of the frame 138. The other end of the leaf spring presses downwardly on a shelf 232 which extends horizontally from the lower end of the plastic cylinder 214 which carries the read/write head 62. This leaf spring serves to prevent any slop or slight movement otherwise possible between the nut 222 and the threaded segment 218 of the shaft from introducing any inaccuracies in positioning of the read/write head 62.

Figure 19:
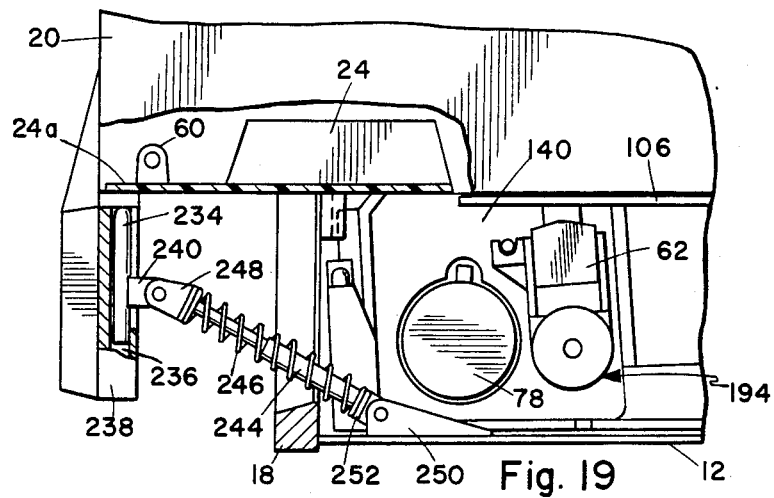
FIGS. 19 and 20 are sequential views illustrating the manner in which the tape cartridge door is gradually opened as the tray carrying the cartridge is inserted into the main portion of the drive to its final position illustrated in FIG. 7.
Figure 20:
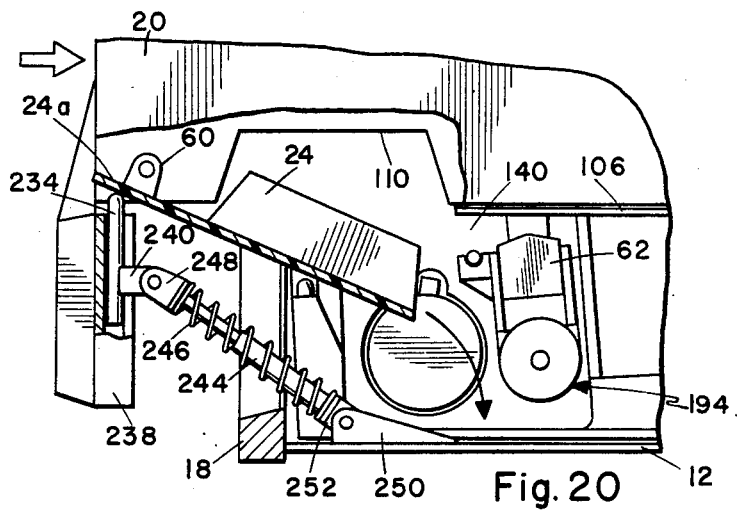

Details of the tape access door opening mechanism are illustrated in FIGS. 19 and 20. A pin 234 is mounted within a horizontal slot 236 formed within a block 238 mounted to the rear side of the side panel 22 of the tray 14. As best seen in FIG. 9, the slot 236 has a rounded portion within which the body of the pin can slide. The slot also has a groove portion in which an ear 240 (FIGS. 9 and 19) connected to the pin 234 can slide. As best seen in FIG. 19, the pin 234 is positioned so that its forward end can engage the rearward end 24a of the tape access door of the cartridge 20 when the cartridge has been fully inserted onto the tray 14. This rearward end 24a of the tape access door is forward of the hinge assembly 60 about which the access door pivots.

Linkage means are provided for connecting the pin 234 (FIG. 19) with the housing so that during inward movement of the tray to its retracted position, the pin 234 will push against the rearward end 24a of the tape access door to open the same. Referring to FIG. 19, the linkage means of the access door opening mechanism includes a telescopic element 244 which is surrounded by a coil spring 246. One end of the telescopic element 244 is attached to the ear 240 of the pin 234 by a pivotal connector 248. The other end of the telescopic element is connected to another ear 250 extending from the side wall of the housing 12 via a pivotal connector 252. The coil spring 246 is slightly compressed between the pivotal connectors 248 and 252 when the tray is in its extended position illustrated in FIG. 8.

The operation of the tape access door opening mechanism will now be better understood by a review of the loading sequence. Initially, the cartridge is inserted into the tray 14 as illustrated in FIG. 2 when the tray is in its extended position. Thereafter, the operator pushes on the forward end of the cartridge to push the tray to its retracted position in which both the tray and the cartridge are entirely within the housing. FIG. 19 illustrates the cartridge 20 fully inserted onto the tray 14 with the tray in its extended position and the tape access door 24 closed.

Inward pushing of the tray as illustrated by the arrow in FIG. 20 causes the telescopic element 244 to initially retract in length somewhat. However, the force of the compressed coil spring 246 gradually moves the pin 234 into contact with the rearward end 24a of the tape access door 24. This causes the tape access door 24 to open as the tray is being pushed inwardly, the opening of the tape access door being indicated by the curved arrow in FIG. 20.

It should be noted that when the tray and the cartridge are being pushed into the drive, the frame 138 and thus the read/write head and the capstan drive mechanism carried thereby are in their disengaged positions, adjacent the sidewall of the housing. The various structures in the drive are dimensioned so that the tape access door follows a path which will just clear the bearing support structure 194 and the head 62. When the tray and cartridge have been fully inserted into the drive, the tape access door is in the position illustrated in FIG. 7.

The unloading sequence is as follows. Initially the load lever 26 is rotated to the horizontal position shown in phantom lines in FIG. 4. This leaves the cartridge loading slot 16 unobstructed. Rotation of the load lever 26 to its horizontal position causes the frame 138 to rotate counter-clockwise to its disengaged position illustrated in FIG. 8. This moves the head and capstan drive clear of the cartridge. Thereafter, as the tray is pulled manually out of the housing, the pin 234 slides to the right in FIG. 8, so that the cartridge can be withdrawn.

The file protect sensor 76 (FIG. 6) is provided by a MICROSWITCH 254 (FIG. 9). The cartridge in place sensor 82 (FIG. 6) is provided by a MICROSWITCH 256 (FIG. 9) both of the microswitches 254 and 256 are mounted on and carried by the pivoting frame 138.

Figures 13, 14:
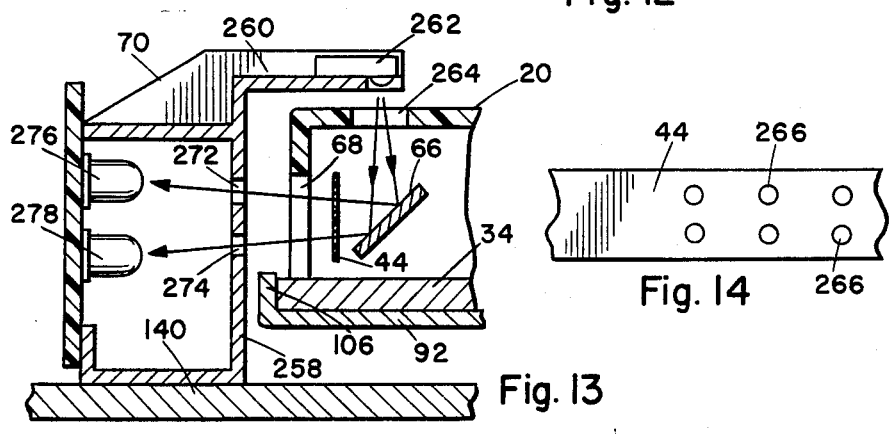
FIG. 13 is an enlarged, vertical sectional view taken along Line 13—13 of FIG. 9 illustrating the mechanism which is utilized to sense the beginning of the magnetic tape and the end of the magnetic tape during operation of the tape drive.
FIG. 14 illustrates a portion of the magnetic tape which has the end indicating perforations.

The EOT/BOT sensing mechanism 70 (FIG. 6) is carried by the frame 138 as illustrated in FIG. 7. Details of the EOT/BOT sensing mechanism 70 are illustrated in FIG. 13. This mechanism includes a housing 238 having a beam 260 which extends over the top of the cartridge 20 adjacent the mirror 66 (FIG. 5) mounted therein. Referring again to FIG. 13, radiation from an infrared light emitting diode 262 is projected through a top transparent window 264 in the top panel of the cartridge 20. This radiation is reflected off of the angled mirror 66 through perforations 266 (FIG. 14) in one end of the length of magnetic tape 44 in the cartridge. Radiation which passes through the perforations in the magnetic tape passes through the front transparent window 68 in the side wall of the cartridge 20. The radiation which passes through the window 68 passes through upper and lower holes 272 and 274 in the side wall of the housing 258. Radiation thus transmitted is detected by upper and lower photo detectors 276 and 278 mounted on the opposite vertical side wall of the housing 258. This sidewall is a small PC board. The various patterns of perforations on the tape and how they are detected as indicating the end of tape, beginning of tape, or early warning holes, is done in conventional fashion.

Having described a preferred embodiment of the cartridge tape drive of the present invention, it should be understood that variations and modifications will occur to those skilled in the art. Accordingly, the protection afforded the invention should be limited only in accordance with the scope of the following claims.

We claim:

1. A drive for an elongate, rectangular tape cartridge having an access door along a side edge thereof which opens by pivoting about an axis substantially perpendicular to a base plate of the cartridge, the cartridge having a length of approximately six inches and width of approximately for inches, the access door being sized so that it increases the width of the cartridge to approximately five and three-quarter inches when pivoted from a closed position to a fully open position, and the cartridge further having a belt capstan roller which protrudes from the side edge of the cartridge and can be rotated to wind a length of magnetic tape between a pair of reels inside the cartridge, comprising:
an elongate housing having means for defining an opening at a transversely extending end of the housing, the housing having a width that permits the housing to fit within an enclosure having a width of approximately five and three-quarter inches, and the opening being dimensioned to have the cartridge longitudinally inserted therein with its access door initially in its closed position and so that the side edge of the cartridge having the access door is substantially parallel to a longitudinally extending side of the housing;
means for supporting the cartridge within the housing when the cartridge is longitudinally inserted in the opening so that throughout the insertion the side edge of the cartridge is substantially parallel to the longitudinally extending side of the housing and the base plate of the cartridge is substantially parallel to a longitudinally extending bottom of the housing;
a read/write head;
means for supporting the read/write head within the housing adjacent the cartridge supporting means;
means for pivoting the access door of the cartridge when the cartridge is inserted in the opening, the access door being pivoted from its closed position to a partially open position so as to clear the read/write head and expose a segment of the length of tape extending between the pair of reels inside the cartridge;
means for operatively engaging and disengaging the read/write head with the segment of tape after the cartridge has been inserted in the slot and the access door has been pivoted to its partially open position; and
means for moving the length of tape between the reels past the magnetic head including a capstan drive roller for engaging the belt capstan roller and providing the driving force for the reels.

2. A drive according to claim 1 wherein the means for supporting the read/write head includes means for reciprocating the read/write head for movement in a direction substantially perpendicular to a plane of the bottom plate of the cartridge to select one of a plurality of tracks of the tape.

3. A tape drive according to claim 2 wherein the means for reciprocating the read/write head includes a motor, screw means driven by the motor for moving the head toward and away from the plane of the bottom plate of the cartridge, said screw means including a threaded shaft and nut, and spring means for biasing a male part of the screw means relative to a female part of the screw means to minimize inaccuracies due to slight movements otherwise possible between the male and female parts of the screw means.

4. A drive according to claim 1 wherein the means for operatively engaging and disengaging the read/write head and the segment of tape in the cartridge includes a manually movable load actuating member mounted at the transversely extending end of the housing.

5. A drive according to claim 4 wherein the load actuating member is movable from an unlocked position clear of the cartridge insertion opening to a locked position in which it blocks at least a portion of the cartridge insertion opening to prevent withdrawal of the cartridge from the housing through the opening.

6. A drive according to claim 1 and further comprising movable reference locator means mounted within the housing adjacent the cartridge supporting means for engaging at least one discrete location on the base plate of the cartridge to thereby establish a predetermined azimuth adjustment between the cartridge and the read/write head.

7. A drive according to claim 1 wherein the means for supporting the read/write head includes a frame and means for movably mounting the frame so that the read/write head can swing in a generally transverse direction toward and away from the cartridge.

8. A drive according to claim 7 wherein the means for operatively engaging and disengaging the read/write head and the segment of tape includes means for causing the frame to swing the read/write head into engagement with the segment of tape.

9. A drive according to claim 8 wherein the means for causing the frame to swing the read/write head includes a manually movable load actuating member mounted at the transversely extending end of the housing and linkage means for coupling the load actuating member with the frame so that movement of the load actuating member will move the frame.

10. A drive according to claim 9 wherein the load actuating member includes a lever rotatable from an unlocked position clear of the cartridge insertion opening in which the read/write head is disengaged from the segment of tape to a locked position in which the lever blocks the opening and in which the read/write head is engaged with the segment of tape.

11. A drive according to claim 1 wherein the means for supporting the read/write head includes a frame and the means for operatively engaging and disengaging the read/write head with the segment of tape includes means for movably mounting the frame with the housing so the read/write head can move into and out of engagement with the segment of tape, and further wherein the read/write head supporting includes means connected to the frame for reciprocating the read/write head for movement in a direction substantially perpendicular to a plane of the bottom plate of the cartridge to select one of a plurality of tracks on the tape.

12. A drive according to claim 1 wherein the means for supporting the read/write head includes a frame, means for movably mounting the frame with the housing so that the read write head can move into and out of engagement with the segment of tape, and means for reciprocating the read/write head in a direction substantially perpendicular to the bottom plate of the cartridge to select one of a plurality of tracks on the length of tape, and further wherein the means for moving the length of tape also includes means for operatively engaging and disengaging the capstan drive roller with the belt capstan roller.

13. A drive according to claim 12 wherein the means for operatively engaging and disengaging the read/write head with the segment of tape and the means for operatively engaging and disengaging the capstan drive roller with the belt capstan roller includes a load actuating member mounted at the transversely extending end of the housing and linkage means for permitting manual movement of the load actuating member between a first position and a second position to thereby simultaneously engage and disengage the head with the segment of tape and the capstan drive roller with the belt capstan roller.

14. A drive for an elongate, rectangular tape cartridge having a length of magnetic tape wound about a pair of reels, a belt capstan roller protruding from a side edge of the cartridge which can be rotated to wind the length of tape between the reels, and an access door along the side edge which opens to expose a segment of the tape by pivoting about an axis substantially perpendicular to a base plate of the cartridge, the cartridge having a length of approximately six inches and width of approximately four inches, and the access door being sized so that it increases the width of the cartridge to approximately five and three-quarter inches when pivoted from a closed position to a fully open position, comprising:

an elongate housing having means for defining a cartridge receiving opening at a transversely extending end of the housing, the housing having a width that permits the housing to fit within an enclosure having a width of approximately five and three-quarter inches, and the opening being dimensioned to have the cartridge longitudinally inserted therethrough with the side edge of the cartridge having the access door substantially parallel to a longitudinally extending side of the housing;

means for supporting the cartridge within the housing when the cartridge is longitudinally inserted through the opening so that throughout the insertion the base plate of the cartridge is substantially parallel to a longitudinally extending bottom of the housing;

a read/write head;

means for supporting the read/write head within the housing adjacent the cartridge supporting means including a frame, means for mounting the frame for movement in a generally transverse direction toward and away from the cartridge and means carried by the frame for reciprocating the read/write head in a direction substantially perpendicular to a plane of the base plate of the cartridge to select one of a plurality of tracks on the tape;

means for pivoting the access door of the cartridge when the cartridge is inserted in the opening, the access door being pivoted to a partially open position between the closed and fully open positions;

capstan drive means for driving the belt capstan roller of the cartridge to wind the length of tape between the pair of reels in the cartridge; and means for substantially simultaneously engaging and disengaging the read/write head with the exposed segment of the tape and the capstan drive means with the belt capstan roller.

15. A drive according to claim 14 wherein the simultaneous engaging and disengaging includes a manually movable load actuating member mounted at the transversely extending end of the housing.

16. A drive according to claim 15 wherein the load actuating member is movable from a first position clear of the cartridge insertion opening and in which the read/write head and capstan drive means are disengaged with the cartridge to a second position in which at least a part of the actuating member blocks the opening and in which the read/write head and capstan drive means are engaged with the cartridge.

17. A drive according to claim 15 and further comprising movable reference locator means mounted within the housing adjacent the cartridge supporting means for moving into engagement with at least one discrete location on the base plate of the cartridge when the read/write head and capstan drive means are moved into engagement.

18. A drive for a rectangular tape cartridge having a length of tape windable between a pair of reels by rotation of a belt capstan roller on a side edge of the cartridge and a pivotable tape access door along the side edge of the cartridge comprising:

means for slidably receiving and supporting the cartridge in a rectangular physical enclosure which has a length dimension which exceeds a width dimension thereof, said physical enclosure having an opening oriented transversely to its length and located at an end thereof for receiving said cartridge, said enclosure width being less than a length of the cartridge, the cartridge being oriented with a longer dimension thereof substantially aligned with the length dimension of the physical enclosure;

means connected to the cartridge receiving and supporting means for partially opening the access door of the cartridge;

a frame;

a read/write head;

means for mounting read/write head on the frame;

means for mounting the frame to the cartridge receiving and supporting means for moving the head into and out of engagement with a segment of tape in the cartridge exposed by opening the access door;

means connected to the head mounting means for moving the head across the width of the tape;

capstan drive means for driving the belt capstan roller of the cartridge; and means for moving the capstan drive means into and out of the engagement with the belt capstan roller.

19. A drive according to claim 18 wherein the cartridge measures approximately six inches in length and approximately four inches in width, the access door increases the width of the cartridge to approximately five and three-quarters inches when fully open and the physical enclosure measures approximately five and three-quarter inches in width.

20. A drive for an elongate, rectangular tape cartridge having a base plate, a top cover, a length of magnetic tape wound about a pair of reels rotatably mounted between the base plate and top cover, a belt capstan roller protruding from a side edge of the cartridge substantially intermediate the length thereof which can be rotated to wind the length of tape between the reels, and an access door along the side edge of the cartridge which is normally biased by a spring to a closed position substantially parallel to the side edge and which can be opened by pushing inwardly on a rearward end of the door to pivot the door and thereby expose a segment of the tape, the door being pivoted in a clockwise manner when opened, viewed from above the top cover of the cartridge, about the axis of a hinge assembly connecting the door to a corner of the cartridge, the hinge assembly axis extending perpendicular to the base plate of the cartridge, the cartridge having a length of approximately six inches along the side edge and a width of approximately four inches along an end edge of the cartridge, and the access door being sized so that it increases the width of the cartridge to approximately five and three-quarter inches when pivoted from its closed position to a fully open position in which it extends at substantially a ninety degree angle relative to the side edge of the cartridge, the drive comprising:

an elongate, generally rectangular housing having a front panel forming at least a part of a transversely extending end of the housing, the housing having a width that permits the housing to fit within an enclosure having a width of approximately five and three-quarter inches, the front panel having a slot formed therein which is dimensioned to have the cartridge longitudinally inserted therethrough with the side edge of the cartridge substantially parallel to a longitudinally extending side of the housing;

means for supporting the cartridge within the housing when the cartridge is longitudinally inserted through the slot in the front panel so that throughout the insertion the side edge of the cartridge having the access door is substantially parallel to the longitudinally extending side of the housing and the base plate of the cartridge is substantially parallel to a longitudinally extending bottom of the housing;

a read/write head;

means for supporting the read/write head within the housing adjacent the cartridge supporting means including a frame, means for mounting the frame for pivoting in a clockwise manner, viewed from above the top cover of the cartridge, toward the cartridge, a stepper motor carried by the frame, means for mounting the read/write head to the frame so that the read/write head can engage the segment of tape when the frame is pivoted in a clockwise manner and the read/write head can reciprocate toward and away from the frame along a direction substantially perpendicular to a plane of the base plate of the cartridge when the cartridge is inserted in the housing, and screw drive means coupling the stepper motor to the head mounting means so that the stepper motor can be energized to move the read/write head toward and away from the frame;

means for pivoting the access door of the cartridge in a clockwise manner to open the door when the cartridge is inserted through the slot into the housing, including means for pusing on the rearward end of the access door to overcome the bias of the spring to thereby pivot the access door from its normally closed position to a partially open position in which it extends at an acute angle relative to the side edge of the cartridge substantially intermediate its closed and fully open positions, the pushing means being configured and positioned so that the access door is opened in proper timed sequence during insertion of the cartridge into the housing through the slot to avoid striking the read/write head or the head mounting means;

capstan drive means for driving the belt capstan roller of the cartridge, including a tape drive motor and a capstan drive roller rotatably driven by the tape drive motor, the capstan drive roller being movable into and out of driving engagement with the belt capstan roller of the cartridge to provide the driving force for the reels to thereby wind the tape between the reels;

means for pivoting the head clockwise into engagement with the exposed segment of tape and for moving the capstan drive roller into driving engagement with the belt capstan roller of the cartridge;

means for pivoting the head counter-clockwise out of engagement with the exposed segment of tape and for moving the capstan drive roller out of driving engagement with the belt capstan roller of the cartridge;

means for permitting the access door of the cartridge to pivot in a counter-clockwise manner from its partially open position to its closed position under the bias of the spring in proper timed sequence as the cartridge is withdrawn from the housing through the slot to avoid striking the read/write head or the head mounting means;

whereby the drive may be mounted within a receptacle in a computer having a width of approximately five and three-quarter inches with only the transverse end of the housing and front panel accessible to an operator and the cartridge can be endwise loaded into and unloaded from the drive through the slot in the front panel, and during loading of the cartridge the tape access door of the cartridge may be opened, and thereafter once the cartridge is fully loaded, the read/write head can be engaged with the exposed segment of tape and the capstan drive roller can be engaged with the belt capstan roller to move the tape past the head, and the read/write head can be reciprocated back and forth across the segment of tape to select one of a plurality of parallel data tracks thereon, and the cartridge will be maintained in a predetermined longitudinally extending path during insertion into the housing, engagement by the read/write head and capstan drive roller within the housing, and during withdrawal of the cartridge from the housing.

21. A drive for an elongate, rectangular tape cartridge having an access door along a side edge thereof which opens by pivoting about an axis substantially perpendicular to a base plate of the cartridge, the cartridge having a length of approximately six inches and width of approximately four inches, and the access door being sized so that it increases the width of the cartridge to approximately five and three-quarter inches when pivoted from a closed position to a fully open position, comprising:

an elongate housing having means for defining an opening at a transversely extending end of the housing, the housing having a width that permits the housing to fit within an enclosure having a width of approximately five and three-quarter inches, and the opening being dimensioned to have the cartridge longitudinally inserted therein with its access door initially in its closed position and so that the side edge of the cartridge having the access door is substantially parallel to a longitudinally extending side of the housing;

means for supporting the cartridge within the housing when the cartridge is inserted in the opening;

a read/write head;

means for supporting the read/write head within the housing adjacent the cartridge supporting means;

means for pivoting the access door of the cartridge when the cartridge is inserted in the opening, the access door being pivoted from its closed position to a partially open position so as to clear the read/write head and expose a segment of a length of tape wound about a pair of reels inside the cartridge;

means for operatively engaging and disengaging the read/write head with the segment of tape after the cartridge has been inserted in the slot and the access door has been pivoted to its partially open position; and means for moving the length of tape between the reels past the magnetic head.

22. A drive according to claim 21 for wherein the read/write head supporting means includes means for positioning the read/write head to select one of a plurality of data tracks on the length of tape.

23. A drive according to claim 21 wherein the means for operatively engaging and disengaging the read/write head and the segment of tape in the cartridge includes a manually movable load actuating member mounted at the transversely extending end of the housing.

24. A drive according to claim 23 wherein the load actuating member includes a lever rotatable about an axis substantially perpendicular to the transversely extending end of the housing, the lever being rotatable from a substantially horizontal unlocked position clear of the cartridge insertion opening to a substantially vertical locked position in which it extends across the cartridge insertion opening.

25. A drive according to claim 21 wherein the means for supporting the read/write head includes a frame and means for movably mounting the frame so that the read/write head can swing in a generally transverse direction toward and away from the cartridge.

26. A drive according to claim 25 wherein the means for operatively engaging and disengaging the read/write head and the segment of tape includes means for causing the frame to swing the read/write head into engagement with the segment of tape.

27. A drive according to claim 26 wherein the means for causing the frame to swing the read/write head includes a manually movable load actuating member mounted at the transversely extending end of the housing and linkage means for coupling the load actuating member with the frame so that movement of the load actuating member will move the frame.

28. A drive according to claim 27 wherein the load actuating member includes a lever rotatable from an unlocked position clear of the cartridge insertion opening in which the read/write head is disengaged from the segment of tape to a locked position in which the lever blocks the opening and in which the read/write head is engaged with the segment of tape.

29. A drive according to claim 21 and further comprising movable reference locator means mounted within the housing adjacent the cartridge supporting means for engaging at least one discrete location on the base plate of the cartridge to thereby establish a predetermined azimuth adjustment between the cartridge and the read/write head.

30. A drive according to claim 21 wherein the means for supporting the read/write head includes a frame and means for movably mounting the frame with the housing so the read/write head can move into and out of engagement with the segment of tape, and further wherein the read/write head supporting includes means carried by the frame for reciprocating the read/write head in a direction substantially perpendicular to the bottom plate of the cartridge to select one of a plurality of tracks on the tape, and further wherein the means for moving the tape includes capstan drive means mounted on the frame for engaging and driving a belt capstan roller of the cartridge when the frame is moved to engage the read/write head with the tape.

31. A drive for an elongate, rectangular tape cartridge having an access door along a side edge thereof which opens by pivoting about an axis substantially perpendicular to a base plate of the cartridge, the cartridge having a length of approximately six inches and width of approximately four inches, and the access door being sized so that it increases the width of the cartridge to approximately five and three-quarter inches when pivoted from a closed position to a fully open position, comprising:

an elongated housing having means for defining a cartridge receiving opening at a transversely extending end of the housing, and housing having a width that permits the housing to fit within an enclosure having a width of approximately five and three-quarter inches, and the opening being dimensioned to have the cartridge longitudinally inserted therein with the side edge of the cartridge having the access door substantially parallel to a longitudinally extending side of the housing;

means for supporting the cartridge within the housing when the cartridge is inserted in the opening;

a read/write head;

means for supporting the read/write head within the housing adjacent the cartridge supporting means;

means for pivoting the access door of the cartridge when the cartridge is inserted in the opening, the access door being pivoted from its closed position to a partially open position to thereby expose a segment of a length of tape wound about a pair of reels inside the cartridge;

means for moving the read/write head between operative engagement and disengagement with the segment of tape after the cartridge has been inserted in the slot and the access door has been pivoted to its partially open position; and means for moving the length of tape between the reels past the magnetic head.

32. A drive according to claim 31 wherein the read/write head supporting means includes means for moving the read/write head in a direction substantially perpendicular to the base plate of the cartridge to select one of a plurality of tracks on the length of tape.

33. A drive according to claim 32 wherein the means for moving the read/write head between operative engagement and disengagement with the segment of tape includes a manually movable load actuating member mounted at the transversely extending end of the housing.

34. A drive according to claim 33 wherein the load actuating member includes a lever rotatable about an axis substantially perpendicular to the transversely extending end of the housing, the lever being rotatable from a substantially horizontal unlocked position clear of the cartridge insertion opening to a substantially vertical locked position in which it extends across the cartridge insertion opening.

35. A drive according to claim 31 wherein the means for supporting the read/write head includes a frame and the means for moving the read/write head includes means for moving the frame in a generally transverse direction toward and away from the cartridge.

36. A drive according to claim 35 wherein the means for moving the frame includes a manually movable load actuating member mounted at the transversely extending end of the housing and linkage means for coupling the load actuating member with the frame so that movement of the load actuating member will move the frame.

37. A drive according to claim 31 wherein the means for pivoting the access door pivots the access door during insertion of the cartridge into the cartridge receiving opening.

38. A drive according to claim 31 and further comprising movable reference locator means mounted within the housing adjacent the cartridge supporting means for engaging at least one discrete location on the base plate of the cartridge.

39. A drive according to claim 31 wherein the means for supporting the read/write head includes a frame and means for movably mounting the frame with the housing so that the read write head can move into and out of engagement with the segment of tape, and further wherein the read/write head supporting includes means for reciprocating the read/write head in a direction substantially perpendicular to the bottom plate of the cartridge to select one of a plurality of tracks on the length of tape, and further wherein the means for moving the length of tape includes capstan drive means for engaging and driving a belt capstan roller of the cartridge and means for moving the capstan drive means between operative engagement and disengagement with the belt capstan roller.

40. A drive according to claim 31 wherein the means for moving the length of tape includes capstan drive means for driving a belt capstan roller of the cartridge, and the head moving means includes a load actuating member mounted at the transversely extending end of the housing and linkage means for permitting manual movement of the load actuating member between locked and unlocked positions to thereby simultaneously engage and disengage the head and capstan drive means with the cartridge.

41. A drive for an elongate, rectangular tape cartridge having a length of magnetic tape wound about a pair of reels and an access door along a side edge thereof which opens to expose a segment of the tape by pivoting about an axis substantially perpendicular to a base plate of the cartridge, the cartridge having a length of approximately six inches and width of approximately four inches, and the access door being sized so that it increases the width of the cartridge to approximately five and three-quarter inches when pivoted from a closed position to a fully open position, comprising:

an elongate housing having means for defining a cartridge receiving opening at a transversely extending end of the housing, the housing having a width that permits the housing to fit within an enclosure having a width of approximately five and three-quarter inches, and the opening being dimensioned to have the cartridge longitudinally inserted therein with the side edge of the cartridge having the access door substantially parallel to a longitudinally extending side of the housing;

means for supporting the cartridge within the housing when the cartridge is inserted in the opening;

a read/write head;

means for supporting the read/write head within the housing adjacent the cartridge supporting means including a frame, means for mounting the frame for movement in a generally transverse direction toward and away from the cartridge and means for reciprocating the read/write head in a direction substantially perpendicular to the base plate of the cartridge to select one of a plurality of tracks on the tape;

means for pivoting the access door of the cartridge when the cartridge is inserted in the opening, the access door being pivoted to a partially open position between the closed and fully open positions;

capstan means mounted to the frame for driving a belt capstan roller of the cartridge to wind the length of tape between the pair of reels in the cartridge; and means for moving the frame to simultaneously engage and disengage the read/write head with the exposed segment of the tape and the capstan means with the belt capstan roller.

42. A drive according to claim 41 wherein the means for moving the frame includes a manually movable load actuating member mounted at the transversely extending end of the housing.

43. A drive according to claim 42 wherein the load actuating member includes a lever rotatable about an axis substantially perpendicular to the transversely extending end of the housing, the lever being rotatable from a substantially horizontal unlocked position clear of the cartridge insertion opening to a substantially vertical locked position in which it extends across the cartridge insertion opening.

44. A drive according to claim 41 wherein the means for moving the frame to simultaneously engage and disengage the read/write head and the capstan means with the cartridge includes means for rotating the frame.

45. A drive according to claim 44 wherein the means for rotating the frame includes a load actuating member mounted at the transversely extending end of the housing and linkage means for coupling the load actuating member with the frame so that movement of the load actuating member will rotate the frame.

46. A drive according to claim 45 wherein the load actuating member includes a lever rotatable from an unlocked position clear of the cartridge insertion opening in which the read/write head and capstan means are disengaged with the cartridge to a locked position in which the lever blocks the opening and in which the read/write head and capstan means are engaged with the cartridge.

47. A drive according to claim 41 and further comprising movable reference locator means mounted within the housing adjacent the cartridge supporting means for moving into engagement with at least one discrete location on the base plate of the cartridge when the read/write head and capstan means are moved into engagement with the cartridge.

48. A drive for a rectangular tape cartridge having a length of tape windable between a pair of reels and a pivotable tape access door along a side edge thereof, comprising:
　means for slidably receiving and supporting the cartridge through a transverse end of a rectangular physical enclosure having a width less than a length of the cartridge, the cartridge being oriented with a longer dimension thereof substantially aligned with a longer dimension of the physical enclosure;
　means connected to the cartridge receiving and supporting means for partially opening the access door of the cartridge;
　a frame;
　means for mounting the read/write head on the frame;
　means for mounting the frame to the cartridge receiving and supporting means for moving the head into and out of engagement with a segment of tape in the cartridge exposed by opening the access door;
　means connected to the head mounting means for moving the head across a width of the tape;
　capstan means for driving a belt capstan roller of the cartridge; and
　means for moving the capstan means into and out of the engagement with the belt capstan roller.

49. A drive according to claim 48 wherein the cartridge measures approximately six inches in length and approximately four inches in width, the access door increases the width of the cartridge to approximately five and three-quarters inches and the physical enclosure measures approximately five and three-quarter inches in width.

50. A tape drive having a tape head and a capstan drive roller for engaging a tape in a tape cartridge mounted in a receptacle within the tape drive, wherein the tape cartridge has a belt capstan roller and a cartridge door that pivots open about an axis perpendicular to a base plate of the cartridge for exposing a length of tape in the cartridge, and the tape cartridge has a long axis substantially parallel to the exposed length of tape defining an endwise position of the cartridge for insertion into the receptacle of the tape drive, the tape drive including means for maintaining the tape head and the capstan drive roller in retracted positions spaced from the receptacle; motor means for driving the capstan drive roller; means for inserting the tape cartridge endwise into the receptacle while the tape head and the capstan drive roller are in said retracted positions so that the tape head and capstan drive roller avoid interference with insertion of the tape cartridge to a stored position in the receptacle; means for holding the tape cartridge door partially open when the tape cartridge is located in the stored position within the receptacle for reducing the effective width of the tape cartridge in said stored position; means for moving the tape head and the capstan drive roller to operative positions within the receptacle in which the tape head is in contact with the exposed length of tape while the cartridge door is maintained in said partially open position and the capstan drive roller is engaged with the belt capstan roller of the cartridge; and means for actuating the tape head and capstant drive roller moving means to simultaneously move the head and the capstan drive roller to said operative positions once the tape cartridge is mounted in the stored position.

51. A drive for an elongate, rectangular tape cartridge having a length of magnetic tape wound about a pair of reels and an access door along a side edge thereof which opens to expose a segment of the tape by pivoting about an axis substantially perpendicular to a base plate of the cartridge, the cartridge having a length of approximately six inches and width of approximately four inches, and the access door being sized so that it increases the width of the cartridge to approximately five and three-quarter inches when pivoted from a closed position to a fully open position, comprising:
　an elongate housing having means for defining a cartridge receiving opening at a transversely extending end of the housing, the housing having a width that permits the housing to fit within an enclosure having a width of approximately five and three-quarter inches, and the opening being dimensioned to have the cartridge longitudinally inserted therein with the side edge of the cartridge having the access door substantially parallel to a longitudinally extending side of the housing;
　means for supporting the cartridge within the housing when the cartridge is inserted in the opening;
　a read/write head;
　means for supporting the read/write head within the housing adjacent the cartridge supporting means including a frame, means for mounting the frame for movement in a generally transverse direction toward and away from the cartridge and means for moving the read/write head in a direction substantially perpendicular to the base plate of the cartridge to select one of a plurality of tracks on the tape;

means for pivoting the access door of the cartridge when the cartridge is inserted in the opening, the access door being pivoted to a partially open position between the closed and fully open positions, the pivoting means including a push member for engaging a rearward end of the tape access door and linkage means for initially supporting the push member outside the housing and adjacent the transversely extending end thereof;

capstan member mounted within the housing for driving a belt capstant roller of the cartridge to wind the length of tape between the pair of reels in the cartridge; and means for moving the frame to engage and disengage the read/write head with the exposed segment of the tape.

52. A drive for an elongate, rectangular tape cartridge having a base plate, a top cover, a length of magnetic tape wound about a pair of reels rotatably mounted between the base plate and top cover, a belt capstan roller protruding from a side edge of the cartridge substantially intermediate the length thereof which can be rotated to wind the length of tape between the reels, and an access door along the side edge of the cartridge which is normally biased by a spring to a closed position substantially parallel to the side edge and which can be opened by pushing inwardly on a rearward end of the door to pivot the door and thereby expose a segment of the tape, the door being pivoted in a clockwise manner when opened, viewed from above the top cover of the cartridge, about the axis of a hinge assembly connecting the door to a corner of the cartridge, the hinge assembly axis extending perpendicular to the base plate of the cartridge, the cartridge having a length of approximately six inches along the side edge and a width of approximately four inches along an end edge of the cartridge, and the access door being sized so that it increases the width of the cartridge to approximately five and three-quarter inches when pivoted from its closed position to a fully open position in which it extends at substantially a ninety degree angle relative to the side edge of the cartridge, the drive comprising:

an elongate, generally rectangular housing having a front panel forming at least a part of a transversely extending end of the housing, the housing having a width that permits the housing to fit within an enclosure having a width of approximately five and three-quarter inches, the front panel having a slot formed therein which is dimensioned to have the cartridge longitudinally inserted therethrough with the side edge of the cartridge substantially parallel to a longitudinally extending side of the housing;

means for supporting the cartridge within the housing when the cartridge is longitudinally inserted through the slot in the front panel so that throughout the insertion the side edge of the cartridge having the access door is substantially parallel to the longitudinally extending side of the housing and the base plate of the cartridge is substantially parallel to a longitudinally extending bottom of the housing;

a read/write head;

means for supporting the read/write head within the housing adjacent the cartridge supporting means including a frame, means for mounting the frame for pivoting in a clockwise manner, viewed from above the top cover of the cartridge, toward the cartridge, a stepper motor carried by the frame, means for mounting the read/write head to the frame so that the read/write head can engage the segment of tape when the frame is pivoted in a clockwise manner and the read/write head can reciprocate toward and away from the frame along a direction substantially perpendicular to a plane of the base plate of the cartridge when the cartridge is inserted in the housing, and screw drive means coupling the stepper motor to the head mounting means so that the stepper motor can be energized to move the read/write head toward and away from the frame;

means for pivoting the access door of the cartridge in a clockwise manner to open the door when the cartridge is inserted through the slot into the housing, including means for pushing on the rearward end of the access door to overcome the bias of the spring to thereby pivot the access door from its normally closed position to a partially open position in which it extends at an acute angle relative to the side edge of the cartridge substantially intermediate its closed and fully open positions, the pushing means being configured and positioned so that the access door is opened in proper timed sequence during insertion of the cartridge into the housing through the slot to avoid striking the read/write head or the head mounting means;

capstan drive means for driving the belt capstan roller of the cartridge, including a tape drive motor and a capstan drive roller rotatably driven by the tape drive motor, the capstan drive roller being movable into and out of driving engagement with the belt capstan roller of the cartridge to provide the driving force for the reels to thereby wind the tape between the reels;

a load actuating member;

means for mounting the load actuating member at the transversely extending end of the housing adjacent the front panel for movement between first and second positions by an operator grasping the member and manually moving the member, the load actuating member being clear of the slot when in its first position and at least partially obstructing the slot when in its second position to prevent withdrawal of the cartridge from the housing through the slot;

movable reference locator means mounted within the housing adjacent the cartridge supporting means for engaging at least one location on the bottom plate of the cartridge linkage means for causing movement of the load actuating member from its first position to its second position to pivot the frame and thereby move the read/write head clockwise into engagement with the exposed segment of tape, move the capstan drive roller into driving engagement with the belt capstan roller of the cartridge, and move the reference locator means into engagement with the one location on the bottom plate of the cartridge, and for causing movement of the load actuating member from its second position to its first position to pivot the frame and thereby move the read/write head counter-clockwise out of engagement with the exposed segment of tape, move the capstan drive roller out of driving engagement with the belt capstan roller of the cartridge, and move the reference locator means out of engagement with the one location on the bottom plate of the cartridge; and means for permitting the access door of the cartridge to pivot in a counter-clockwise manner from its partially open position to its closed position under the bias of the spring in proper timed sequence as the cartridge is withdrawn from the housing through the slot to avoid striking the read/write head or head mounting means;

wherein the drive may be mounted within a receptacle in a computer having a width of approximately five and three-quarter inches with only the transverse end of the housing and front panel accessible to an operator and the cartridge can be endwise loaded into and unloaded from the drive through the slot in the front panel, and during loading of the cartridge the tape access door of the cartridge may be opened, and thereafter once the cartridge is fully loaded, the read/write head can be engaged with the exposed segment of tape, the capstan drive roller can be engaged with the belt capstan roller, and the reference locator means can be engaged with the one location on the bottom plate of the cartridge, all by manual movement by the operator of the load actuating member at the transversely extending end of the housing, and the cartridge will be maintained in a predetermined longitudinally extending path during insertion into the housing, engagement by the head, capstan drive roller and locator means within the housing, and during withdrawal of the cartridge from the housing, and the read/write head can be reciprocated back and forth across the segment of tape to select one of a plurality of parallel data tracks thereon.

* * * * *

UNITED STATES PATENT AND TRADEMARK OFFICE
CERTIFICATE OF CORRECTION

PATENT NO. : 4,677,508

DATED : June 30, 1987

INVENTOR(S) : William M. Barton, Jr. et al.

It is certified that error appears in the above-identified patent and that said Letters Patent is hereby corrected as shown below:

On the face sheet, in the left hand column, after "Assignee" and before "Appl. No.", insert --Notice: The portion of the term of this patent subsequent to February 25, 2003 has been disclaimed.-- .

On the face sheet, in the right hand column, under the heading "FOREIGN PATENT DOCUMENTS", after "822012 11/1974", change "France" to --Belgium-- .

Claim 1, column 11, line 57, insert --a-- before "width", and in line 58, change "for" to --four-- .

Claim 2, column 12, line 41, change "bottom" to --base-- .

Claim 3, column 12, line 46, change "bottom" to --base-- .

Claim 11, column 13, line 37, change "bottom" to --base-- .

Claim 12, column 13, line 45, change "bottom" to --base-- .

Claim 14, column 14, line 3, insert --a-- before "width".

Claim 18, column 15, line 18, insert --the-- before "read/write".

Claim 20, column 17, line 7, before "front panel", insert --the-- .

Claim 21, column 17, line 31, insert --a-- before "width".

Claim 30, column 18, line 55, change "bottom" to --base-- .

Claim 31, column 18, line 66, insert --a-- before "width", and in column 19, line 3, change "elongated" to --elongate-- .

Claim 39, column 20, line 10, change "bottom" to --base-- .

Claim 41, column 20, line 35, insert --a-- before "width".

Claim 48, column 21, immediately after line 58, insert --a read/write head;-- as a separate subparagraph.

Claim 50, column 22, line 11, delete "a tape in".

Claim 50, column 22, line 39, change "capstant" to --capstan-- .

Claim 51, column 22, line 49, insert --a-- before "width" and in column 23, line 17, change "member" to --means--.

Claim 51, column 23, line 18, change "capstant" to --capstan-- .

Claim 52, column 24, line 57, after "cartridge" insert --;--.

Claim 52, column 25, line 16, change "wherein" to --whereby-- .

Claim 52, column 25, line 19, before "front panel" insert --the-- .

UNITED STATES PATENT AND TRADEMARK OFFICE
CERTIFICATE OF CORRECTION

PATENT NO. : 4,677,508

DATED : June 30, 1987

INVENTOR(S) : William M. Barton, Jr. et al.

It is certified that error appears in the above-identified patent and that said Letters Patent is hereby corrected as shown below:

Claim 52, column 24, line 56, change "bottom" to --base--.

Signed and Sealed this

Fifth Day of April, 1988

*Attest:*

DONALD J. QUIGG

*Attesting Officer*      *Commissioner of Patents and Trademarks*